US009250323B2

(12) United States Patent
Ranney et al.

(10) Patent No.: US 9,250,323 B2
(45) Date of Patent: Feb. 2, 2016

(54) TARGET DETECTION UTILIZING IMAGE ARRAY COMPARISON

(75) Inventors: Kenneth I. Ranney, Rockville, MD (US); Anthony F. Martone, Ellicott City, MD (US); Roberto Innocenti, Clarksville, MD (US); Lam H. Nguyen, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 779 days.

(21) Appl. No.: 13/480,420

(22) Filed: May 24, 2012

(65) Prior Publication Data

US 2015/0061926 A1    Mar. 5, 2015

Related U.S. Application Data

(63) Continuation-in-part of application No. 13/046,250, filed on Mar. 11, 2011, now Pat. No. 8,665,132, which is a continuation-in-part of application No. 12/881,364, filed on Sep. 14, 2010, now Pat. No.

(Continued)

(51) Int. Cl.
*G01S 13/90* (2006.01)
*G01S 7/41* (2006.01)
*G01S 13/88* (2006.01)

(52) U.S. Cl.
CPC ............. *G01S 13/9029* (2013.01); *G01S 7/414* (2013.01); *G01S 13/888* (2013.01)

(58) Field of Classification Search
CPC .... G01S 13/888; G01S 13/9029; G01S 7/414
USPC ......................................................... 342/25 B
See application file for complete search history.

(56) References Cited

U.S. PATENT DOCUMENTS

| 5,111,823 | A |   | 5/1992 | Cohen |             |
|-----------|---|---|--------|-------|-------------|
| 5,349,359 | A | * | 9/1994 | Dallaire | ........... H01Q 21/22 |
|           |   |   |        |       | 342/195 |

(Continued)

OTHER PUBLICATIONS

Marc Ressler, Lam Nguyen, Francois Koenig, David Wong, and Gregory Smith, "The Army Research Laboratory (ARL) Synchronous Impulse Reconstruction (SIRE) Forward-Looking Radar," Proceedings of SPIE, Unmanned Systems Technology IX, vol. 6561, Apr. 2007.

(Continued)

*Primary Examiner* — Timothy A Brainard
(74) *Attorney, Agent, or Firm* — Lawrence E. Anderson

(57) ABSTRACT

A method and system for forming an image comprising at least one processor for performing the following: initializing an N by P image array $I_O$ by setting all values to a large number; inputting at least one image frame; randomly selecting and removing a subset of pixel locations from the total number of available pixel locations to form a preliminary image array $I_C$; for each pixel location comparing the complex magnitude of each pixel in the image array $I_O$ with the magnitude of the corresponding pixel in image array $I_C$, and if the pixel value in the image array $I_C$ is smaller than the corresponding pixel in the image array $I_O$ or if the $I_C$ value equals 0, then the current pixel value in image array $I_O$ is replaced by the pixel value in the image array $I_C$; and repeating for a number of iterations to form an image.

11 Claims, 16 Drawing Sheets
(12 of 16 Drawing Sheet(s) Filed in Color)

Related U.S. Application Data 8,193,967, which is a continuation-in-part of application No. 12/331,888, filed on Dec. 10, 2008, now Pat. No. 7,796,829.

(60) Provisional application No. 61/561,553, filed on Nov. 18, 2011.

(56) References Cited

U.S. PATENT DOCUMENTS

| | | | |
|---|---|---|---|
| 5,465,722 | A | 11/1995 | Fort et al. |
| 5,673,050 | A | 9/1997 | Moussally et al. |
| 5,805,098 | A | 9/1998 | McCorkle |
| 6,087,981 | A | 7/2000 | Normant et al. |
| 6,400,306 | B1 | 6/2002 | Nohara et al. |
| 7,538,712 | B2 | 5/2009 | Allen et al. |
| 7,796,829 | B2 | 9/2010 | Nguyen et al. |
| 7,961,134 | B2 | 6/2011 | Ranney et al. |
| 8,193,967 | B2 | 6/2012 | Nguyen et al. |
| 8,502,731 | B2 | 8/2013 | Martone et al. |
| 8,620,093 | B2 | 12/2013 | Nguyen et al. |
| 8,624,773 | B2 | 1/2014 | Nguyen et al. |
| 8,665,132 | B2 | 3/2014 | Ranney et al. |
| 8,824,544 | B2 | 9/2014 | Nguyen et al. |
| 8,861,588 | B2 | 10/2014 | Nguyen et al. |
| 9,075,129 | B2 | 7/2015 | Nguyen et al. |
| 2005/0030393 | A1 | 2/2005 | Tull |
| 2005/0129324 | A1 | 6/2005 | Lemke |
| 2012/0182171 | A1 | 7/2012 | Martone et al. |
| 2012/0206293 | A1 | 8/2012 | Nguyen et al. |
| 2013/0244710 | A1 | 9/2013 | Nguyen et al. |
| 2014/0009324 | A1 | 1/2014 | Ranney et al. |

OTHER PUBLICATIONS

Wehner, D., "High Resolution Radar," Artech House, Norwood MA, Chapter 6, "Synthetic Aperture Radar," pp. 183-271, copyright 1987.
Nguyen, L., "Image Resolution Computation for Ultra-Wideband (UWB) Synchronous Impulse Reconstruction (SIRE) Radar" Army Research Laboratory Technical Report ARL-TN-294, Army Research Laboratory Adelphi, MD 20783-1197, Sep. 2007.
Nguyen, L.; Wong, D.; Ressler, M.; Koenig, F.; Stanton, B.; Smith, G.; Sichina, J.; Kappra, K. "Obstacle Avoidance and Concealed Target Detection Using the Army Research Lab Ultra-Wideband Synchronous Impulse Reconstruction (UWB SIRE) Forward Imaging Radar," Proceedings of SPIE, Detection and Remediation Technologies for Mines and Minelike Targets XII, vol. 6553, Apr. 2007.
Nguyen, L.; Ressler, M.; Sichina, J. "Sensing Through the Wall Imaging Using the Army Research Lab Ultra-wideband Synchronous Impulse Reconstruction (UWB SIRE) Radar," Proceedings of SPIE, Radar Sensor Technology XII, vol. 6947, Apr. 2008.
Nguyen, L.; Soumekh, M. "System Trade Analysis for an Ultra-wideband Forward Imaging Radar," Proceedings of SPIE, Unmanned Systems Technology VIII, vol. 6230, 2006.
Nguyen, L. H.; Ton, T.; Wong, D.; Soumekh, M. "Adaptive Coherent Suppression of Multiple Wide-bandwidth RFI Sources in SAR," Proceedings of SPIE Int. Soc. Opt. Eng. vol. 5427, 1, 2004.
Nguyen, L.; Soumekh, M. "Suppression of Radio Frequency Interference (RFI) for Equivalent Time-sampling Ultra-wideband Radar," Proceedings of SPIE, Algorithms for Synthetic Aperture Radar Imagery XII, 2005.
McCorkle, J.; Nguyen, L. "Focusing of Dispersive Targets Using Synthetic Aperture Radar," ARL-TR-305; U.S. Army Research Laboratory: Adelphi, MD, Aug. 1994.
Nguyen, L. "Signal Processing Technique to Remove Signature Distortion in ARLSynchronous Impulse Reconstruction (SIRE) Ultra-Wideband (UWB) Radar;" ARL-TR-4404; U.S. Army Research Laboratory: Adelphi, MD, Mar. 2008.
Nguyen, L., et al. "Signal Processing Techniques for Forward Imaging Using Ultrawideband Synthetic Aperture Radar," Proceedings of SPIE, vol. 5083, Unmanned Ground Vehicle Technology V, Sep. 2003, pp. 505-518.
M. Ressler et al., "The Army Research Laboratory Ultra-Wideband Testbed Radars," IEEE 1995 International Radar Conference, Alexandria, Va., May 1995.
John W. McCorkle, "Focusing Of Synthetic Aperture Ultra Wideband Data," IEEE Int'l Conf on Systems Engineering, Aug. 1992, p. 1-5.
L. Nguyen, "SAR Imaging Technique for Reduction of Sidelobes and Noise," Proc. SPIE, vol. 7308, 73080U (2009); doi:10.1117/12.820480 Online Publication Date: Apr. 29, 2009.
H. C. Stankwitz, R. J. Dallaire, J. R. Fienup, "Nonlinear Apodization for Sidelobe Control in SAR Imagery," IEEE Trans. on Aerospace and Electronic System, vol. 31, No. 1, Jan. 1995, pp. 267-279.
Mark A. Schulze, et al., "Noise Reduction in Synthetic Aperture Radar Imagery Using a Morpohology-based Nonlinear Filter," Proceedings of DICTA96, Digital Image Computing Techniques and Applications (Conference of the Australian Pattern Recognition Society, Brisbane, Australia) pp. 661-666 (Dec. 6-8, 1995 Draft downloaded from Google Scholar).
Richard Rau, et al. "Analytic Models and Postprocessing Techniques for UWB SAR," IEE Transactions on Aerospace and Electronic Systems, vol. 36, No. 4, Oct. 2000.
L. Novak, "Change Detection for Multi-polarization, Multi-pass SAR," Proceedings of SPIE, vol. 5808, 2005, pp. 234-246.
F. Rocca, C. Cafforio, and C. Prati, "Synthetic Aperture Radar: A New Application for Wave Equation Techniques," Geophysical Prospecting, vol. 37, 1989, pp. 809-830.
C. Cafforio, C. Prati, and F. Rocca, "SAR Data Focusing Using Seismic Migration Techniques," IEEE Transactions on Aerospace and Electronic Systems, vol. AES-27, No. 2, Mar. 1991, pp. 194-206.
R. Bamler, "A Comparison of Range Doppler and Wavenumber Domain SAR Focusing Algorithms," IEEE Transactions on Geoscience and Remote Sensing, vol. 30, No. 4, Jul. 1, 1992, pp. 706-713.
L. Happ et al., "Low-Frequency Ultra-Wideband Synthetic Aperture Radar 1995 BoomSAR Tests," IEEE 1996 National Radar Conference, Ann Arbor, Mich., May 1996.
K. Ranney, et al., "Modified Difference Change Detector for Small Targets in Synthetic Aperture Radar Imagery," IEEE Transactions on Aerospace and Electronic Systems, vol. 44, No. 1, 2008, pp. 57-76.
Emmanuel Candes, et al. "Robust uncertainty principles: Exact signal reconstruction from highly incomplete frequency information," (IEEE Trans. on Information Theory, 52(2) pp. 489-509, Feb. 2006).
H. Liu, Y. Zhu, J. He, H. Zhao, Q. Fu, "Modelling and Simulation of a Stepped Frequency Radar System Based on LabVIEW", Proceedings of IEEE 2008 International Conference on Radar, Sep. 2-5, 2008, 397-401.
E. J. Candès, M. B. Walkin, "An Introduction To Compressive Sampling," IEEE Signal Processing Magazine, Mar. 2008, 21-30.
L. Nguyen and M. Soumekh, "Improving SAR image of mine-type targets from restricted radar band data," Proc. SPIE 5794, 522 (2005), DOI:10.1117/12.603811.
Lord and M. Inggs, "Approaches to RF Interference Suppression for VHF/UHF Synthetic Aperture Radar," in IEEE Proceedings of the 1998 South African Symposium on Communications and Signal Processing 1998, Rondebosch, South Africa, pp. 95-100, Sep. 1995.
E. Rignot and J. Van Zyl, "Change Detection Techniques for ERS-1 SAR Data," IEEE Transactions on Geoscience and Remote Sensing, vol. 31, No. 4, 1993, pp. 896-906.
E. Rignot and R. Chellappa, "A Bayes Classifier for Change Detection in Synthetic Aperture Radar Imagery," Proceedings of IEEE International Conference on Accoustics Speech and Signal Processing, vol. 3, 1992, pp. 25-28.

\* cited by examiner

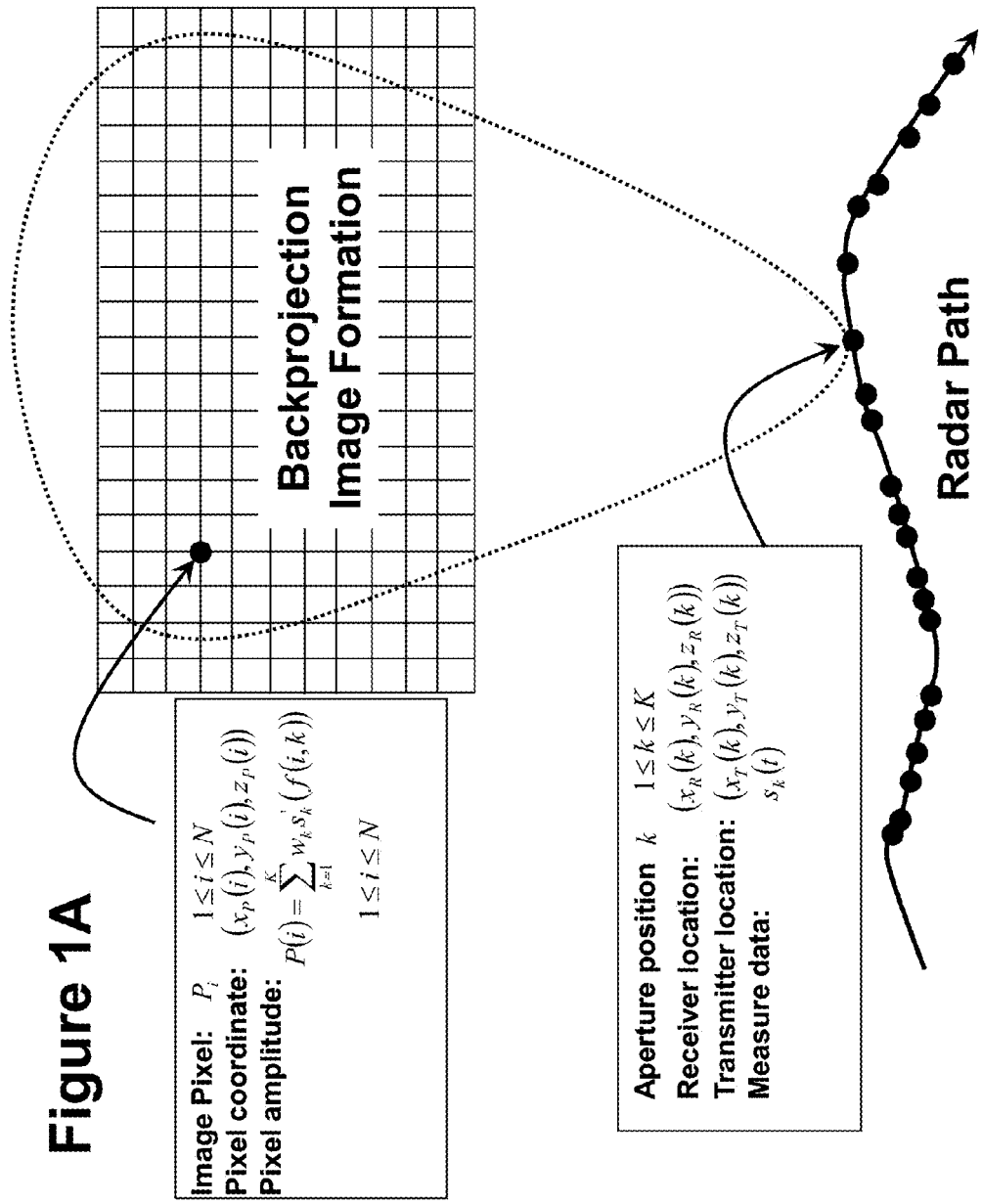

FIGURE 3  NOTE: L<K; each iteration contains a randomly chosen subset of the number of positions of the original apertures FIG. 4 Recursive Sidelobe Minimization (RSM) Technique Using Multiple Compressive Apertures Transmission and Reception of Stepped Frequency Waveform
Flowchart Expansion of BOXES 11, 12 & 13.

FIG. 10 *VECTORS OF DIFFERENTIATED RECEIVER CHANNEL OUTPUTS*

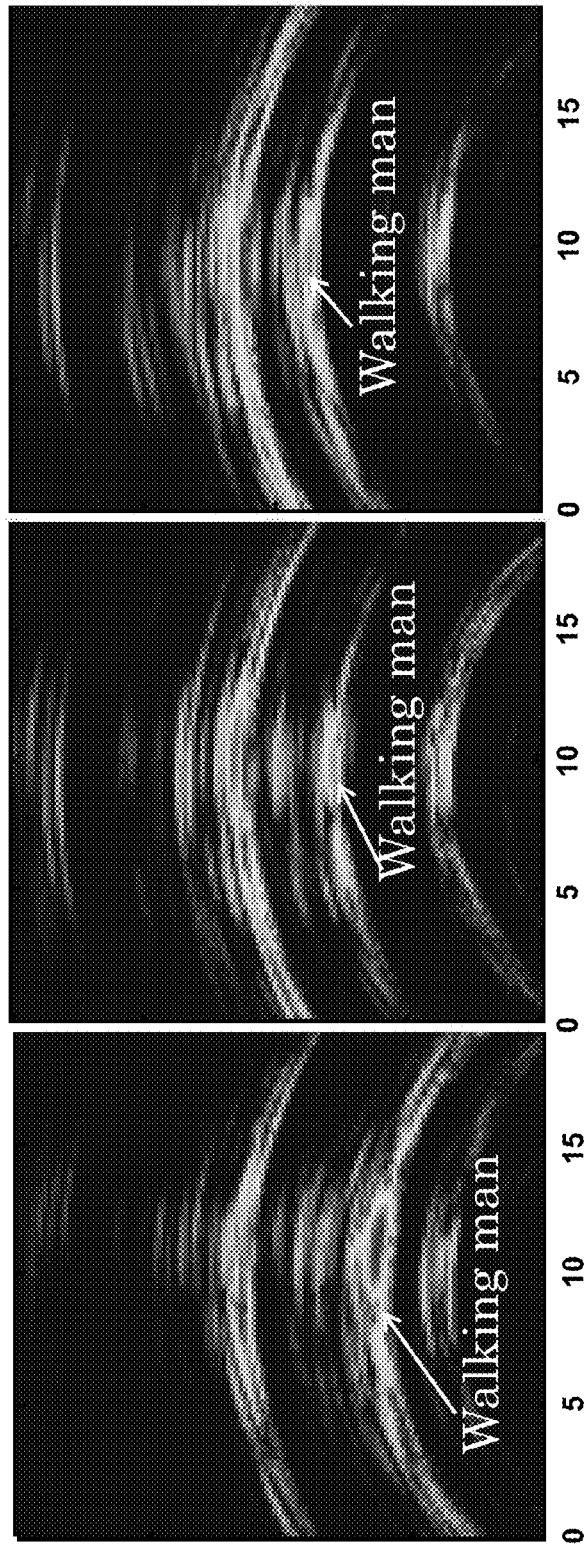
Figure 14. Example of CD image showing a man walking behind a cinderblock wall. The dynamic range of the image is 30dB (relative to the peak pixel value) – same color scale as Figure 1.

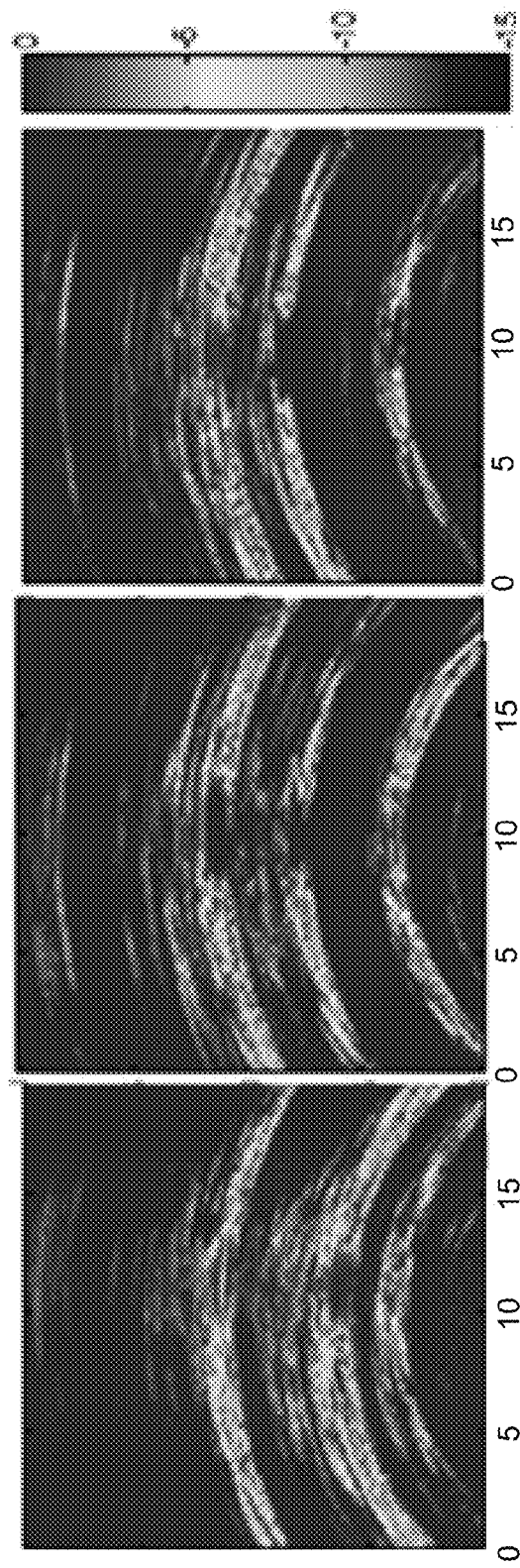
Figure 15. Image showing reduction in sidelobe level (in dB) realized by the RLA processing.

TARGET DETECTION UTILIZING IMAGE ARRAY COMPARISON

CROSS REFERENCE TO RELATED APPLICATIONS

This application is a continuation-in-part to U.S. patent Ser. No. 13/046,250 entitled "System and Method for Iterative Fourier Side Lobe Reduction, filed Mar. 11, 2011 (ARL 09-20CIP), hereby incorporated by reference, which is a continuation-in-part of and claims priority to U.S. application Ser. No. 12/881,364, filed on Sep. 14, 2010, entitled "Method and System for Forming Very Low Noise Imagery Using Pixel Classification," and U.S. patent application Ser. No. 12/331,888, filed on Dec. 10, 2008, now U.S. Pat. No. 7,796,829, entitled "Method and system for forming an image with enhanced contrast and/or reduced noise." U.S. patent application Ser. Nos. 13/046,250, 12/331,888 and U.S. Pat. No. 7,796,829 are hereby incorporated by reference as though fully rewritten herein. This application is the nonprovisional application (and claims priority to) Provisional Application No. 61/561,553, entitled Randomized Antenna Array for Moving Target Indication, filed Nov. 18, 2011 (hereby incorporated by reference).

BACKGROUND OF THE INVENTION

Detection of targets hidden behind walls remains an important area of research within the radar community, and many researchers have recently reported interesting findings. The need for effective wall penetration has often driven investigators to consider systems utilizing lower frequencies, while the need for high resolution has driven them to consider large-bandwidth systems. One such system—the Army Research Laboratory's ultra-wideband (UWB) synchronous, impulse reconstruction (SIRE) radar—includes both of these characteristics. Not surprisingly, it has shown promise when leveraged for sensing through the wall (STTW) applications.

Much of past moving target indication (MTI) work centered on STTW detection of moving targets using SIRE radar data. This work, however, has not incorporated newly formulated extensions of documented synthetic aperture radar (SAR) techniques, and inclusion of these adapted techniques should produce higher quality MTI imagery. In particular, there exists a need for elimination of artifacts in cross range due to time-domain focusing methodologies such as time-domain back-projection.

SUMMARY OF THE PRESENT INVENTION

A preferred embodiment of the present invention is directed to an artifact-reduction technique for near-field, time-domain, through the wall (TTW) MTI image-formation algorithms. The technique exploits measurements from multiple realizations of a randomly configured, linear receive array, rather than simply processing measurements from the original array. This "multi-array" processing effectively reduces cross-range sidelobe artifacts at the expense of additional computational complexity. The randomly configured, linear receive arrays are implemented through the random excision of a subset of available receive channels, and the output MTI image is produced through a judicious combination of imagery created with the various sub-arrays.

A preferred embodiment system for forming an image comprises at least one processor for performing the following; initializing an N by P image array $I_O$ by setting all values to a large number; inputting at least one image frame; randomly selecting and removing a subset of pixel locations from the total number of available pixel locations to form a preliminary image array $I_C$; for each pixel location (i,j) comparing the complex magnitude of each pixel in the image array $I_O$ with the magnitude of the corresponding pixel in image array $I_C$, and if the pixel value in the image array $I_C$ is smaller than the corresponding pixel in the image array $I_O$ or if the $I_C$ value equals 0, then the current pixel value in image array $I_O$ is replaced by the pixel value in the image array $I_C$; and repeating for a number of iterations to form an image.

A preferred methodology comprises inputting from at least one data receiving element data representing positional and radar data; each of the positional data forming a positional record in an array of positional records; each of the radar data comprising a first number of radar data points in the frequency domain, forming an image comprising an array of pixel values comprising:
a) randomly setting a percentage of the first number of radar data points to zero;
b) transforming the first number of radar data points into time domain projection data;
c) differentiating the projection data in the time domain to create a new set of projection data indicating the location of moving targets;
d) forming an image by processing the projection data utilizing an imaging subsystem that combines the positional and projection data to form the moving target indication (MTI) imagery utilizing one of a back-projection algorithm or range migration algorithm;
e) forming the complete aperture $A_0$ for MTI image formation comprising combining the projection data, the coordinates of the receiver, and the coordinates of the transmitter for each positional record;
f) forming an imaging grid comprising M image pixels wherein each pixel in the imaging grid is located at coordinate $(x_P(i), y_P(i), z_P(i))$;
g) saving the pixel values for each of the M image pixels into a composite image grid;
h) randomly setting a percentage of the first number of radar data points to zero;
i) transforming the first number of radar data points into time domain projection data;
j) differentiating the projection data in the time domain to create a new set of projection data indicating the location of moving targets;
k) forming an image by processing the projection data utilizing an imaging subsystem that combines the positional and projection data to form the SAR imagery utilizing one of a back-projection algorithm or range migration algorithm;
l) forming the complete aperture $A_0$ for MTI image formation comprising
combining the projection data, the coordinates of the receiver, and the coordinates of the transmitter for each positional record;
m) forming an imaging grid comprising M image pixels wherein each pixel in the imaging grid is located at coordinate $(x_P(i), y_P(i), z_P(i))$;
n) comparing the pixel values of the imaging grid to the corresponding pixel values of the composite image;
o) replacing the pixel values in the composite image grid if the pixel value is less in the imaging grid than the corresponding pixel value of the composite image grid to form a new composite image grid;
p) repeating the steps g) through m) for a predetermined number of iterations;

whereby the composite image grid is outputted with reduced sidelobes and noise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In FIGS. 11, 13-15 the colors represent a decibel range which ranges from red to blue, red being the strongest signal and blue being the weakest.

These and/or other aspects and advantages of the invention will become apparent and more readily appreciated from the following description of the embodiments, taken in conjunction with the accompanying drawings of which: The drawings of this invention are illustrative and diagrammatic in nature in order to present the principles of the invention. They are being provided as examples without limiting the invention to the specific configuration or dimensions shown.

FIG. 1A is a schematic diagram of a generalized conventional technique for image projection.

Figure 1B:
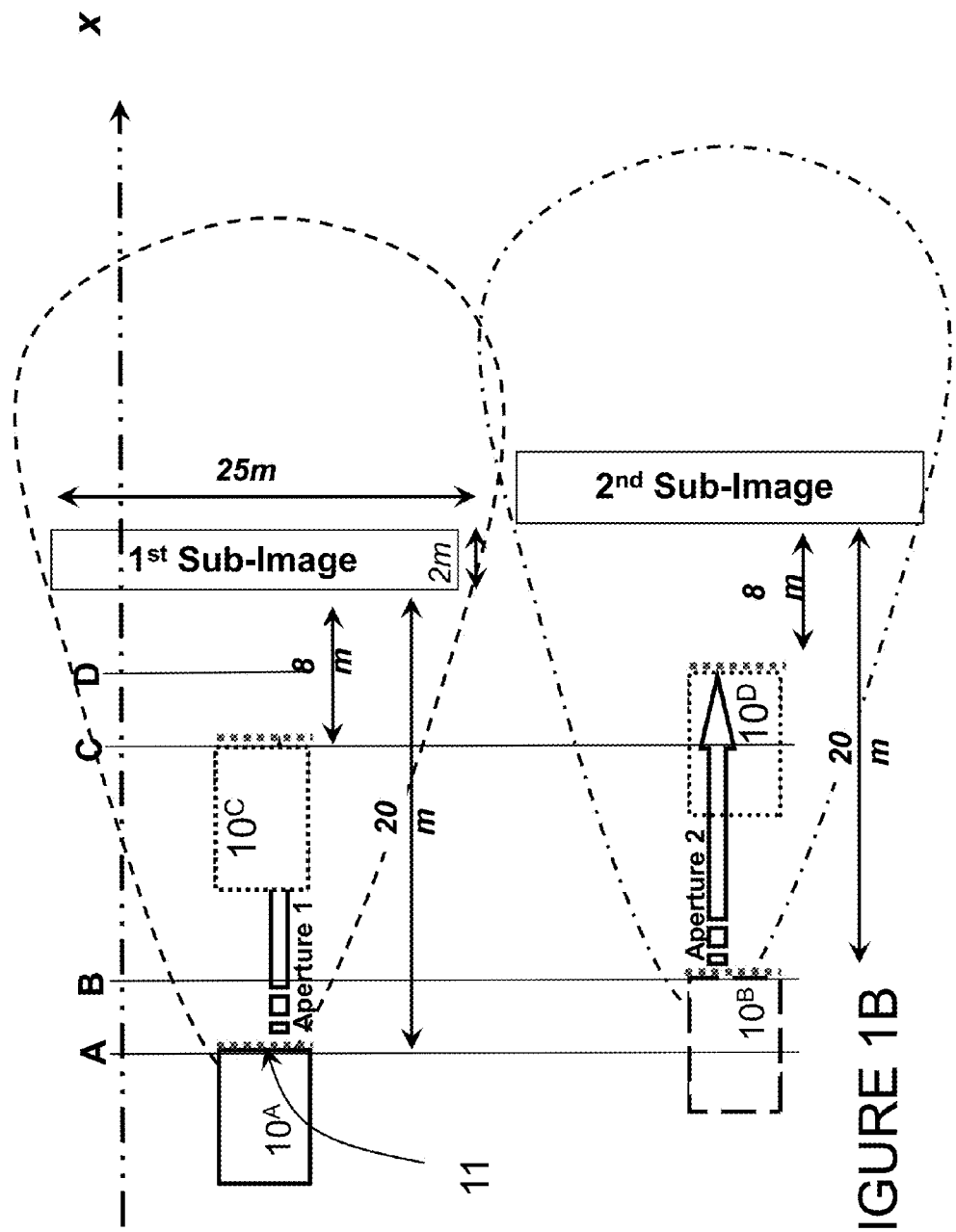

FIG. 1B is a schematic diagram of ultra wide band (UWB) forward looking radar imaging geometry and mosaic imaging.

Figure 2:
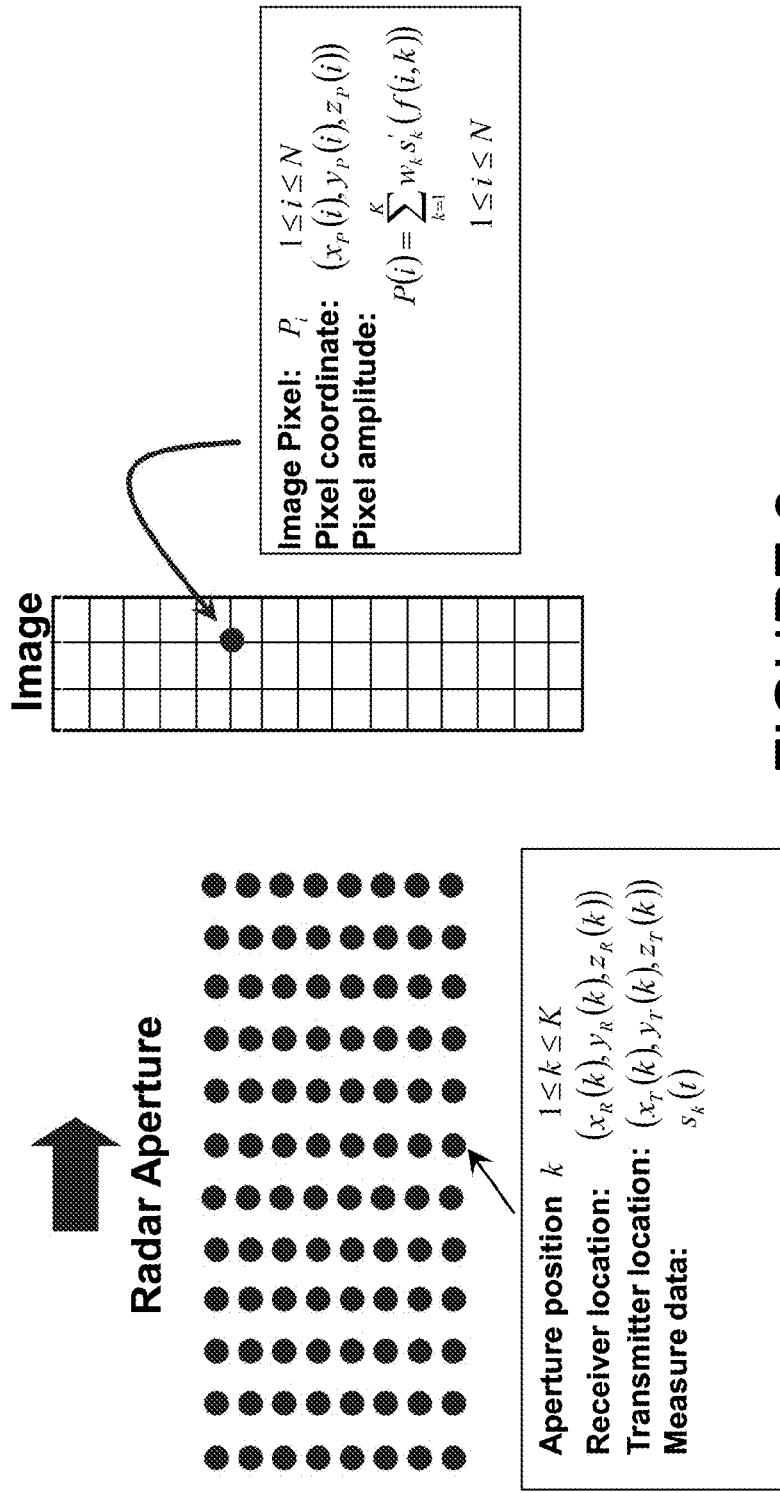

FIG. 2 illustrates the back-projection image formation being applied to each sub-image.

Figure 3:
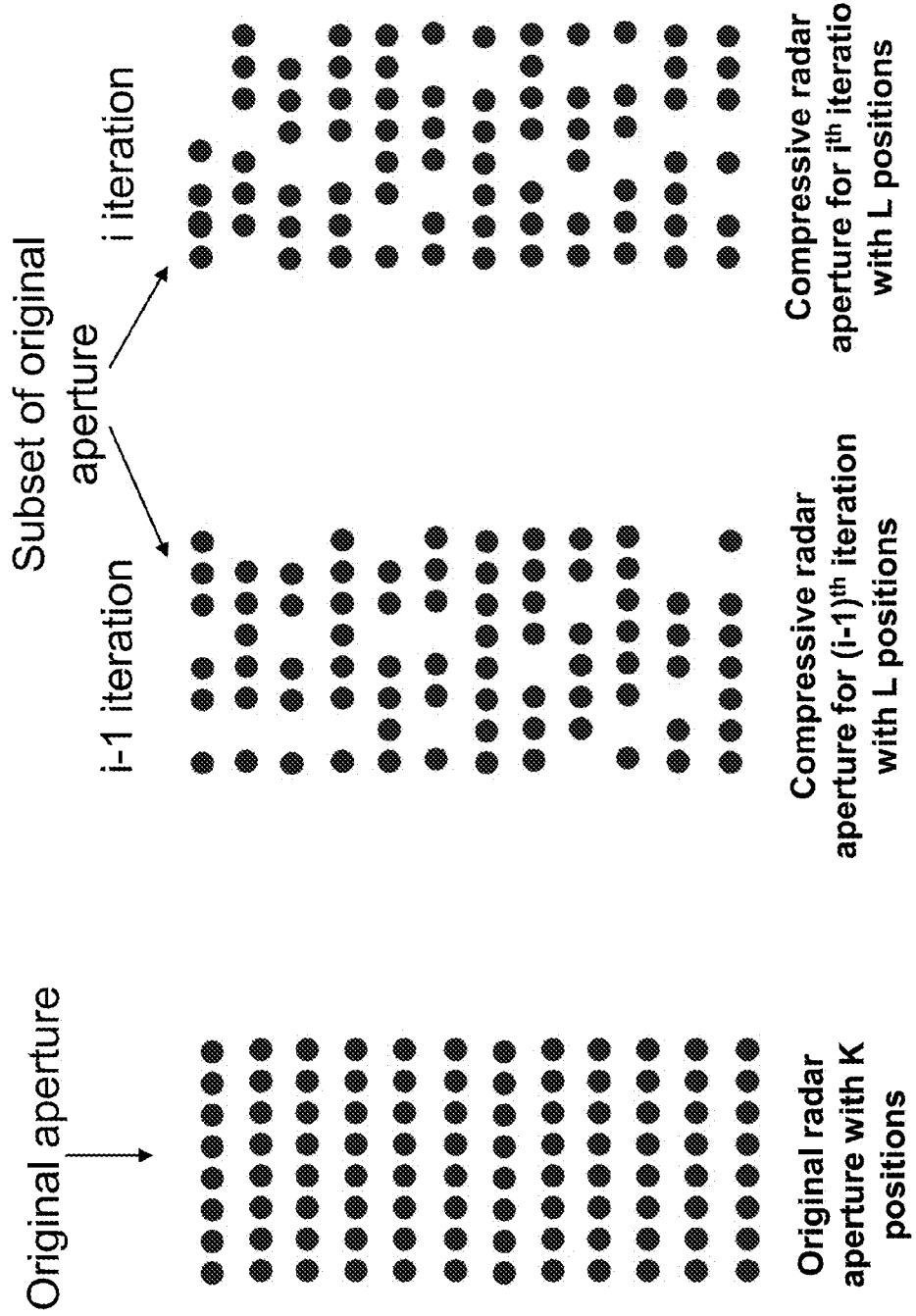

FIG. 3 is a schematic diagram illustrating a comparison of an original aperture and the generation of a subset of the radar aperture for each iteration.

Figure 4:
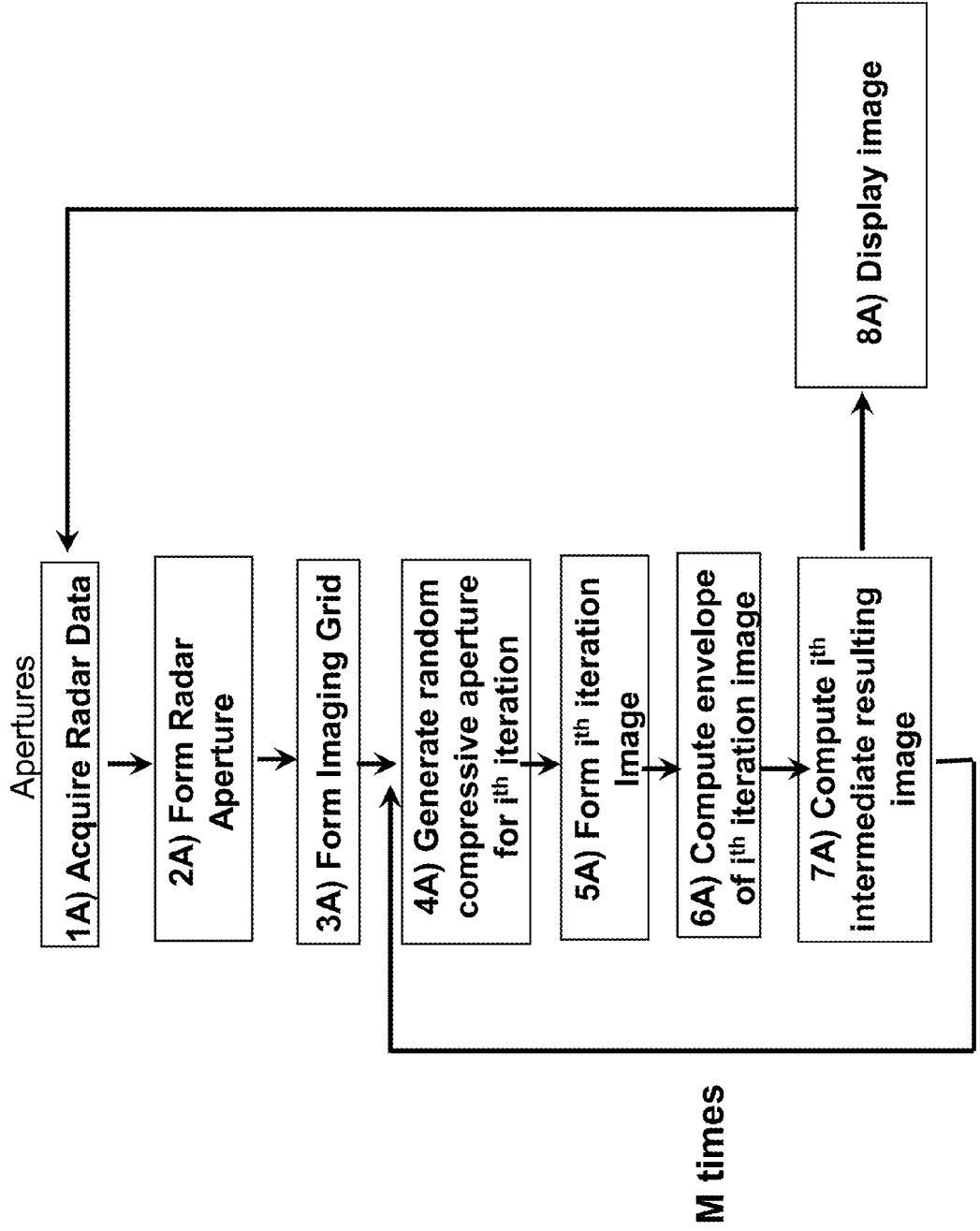

FIG. 4 is a flow chart representation of an embodiment utilizing a Recursive Sidelobe Minimization (RSM) Technique using multiple compressive apertures.

Figure 5:
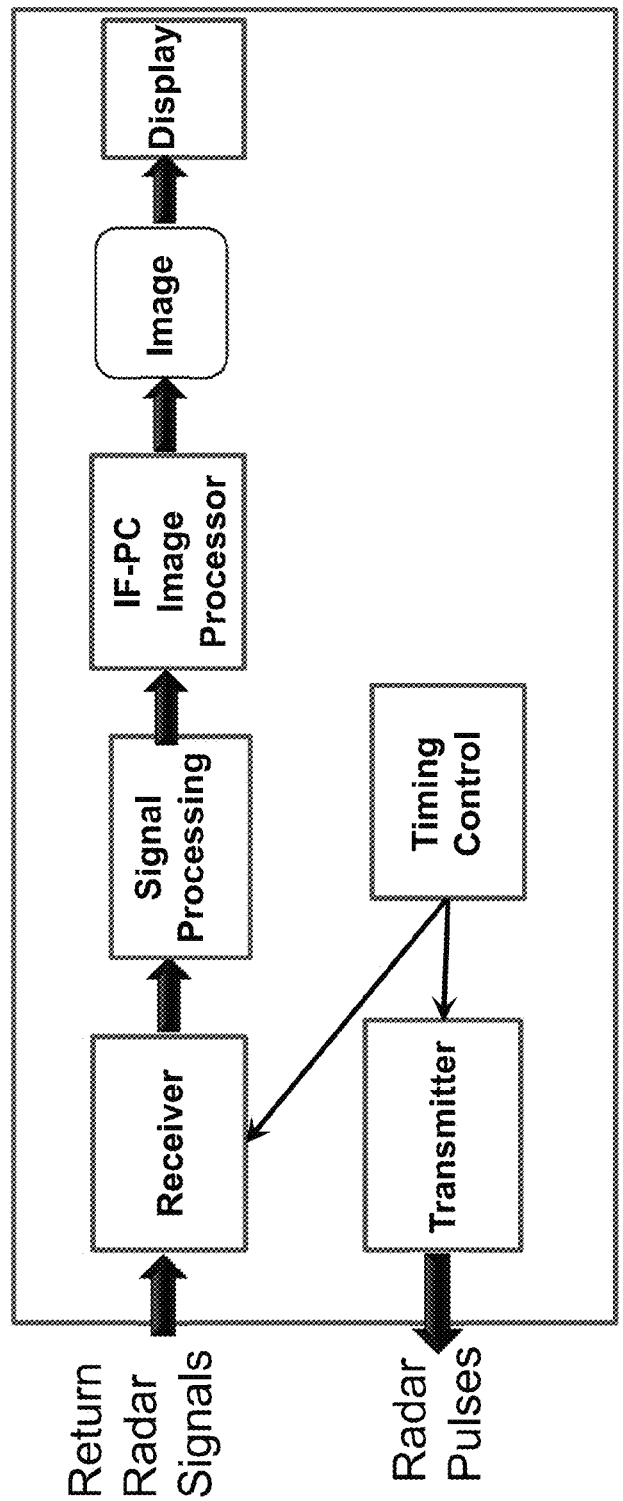

FIG. 5 illustrates an overall SAR system block diagram of an embodiment.

Figure 6:
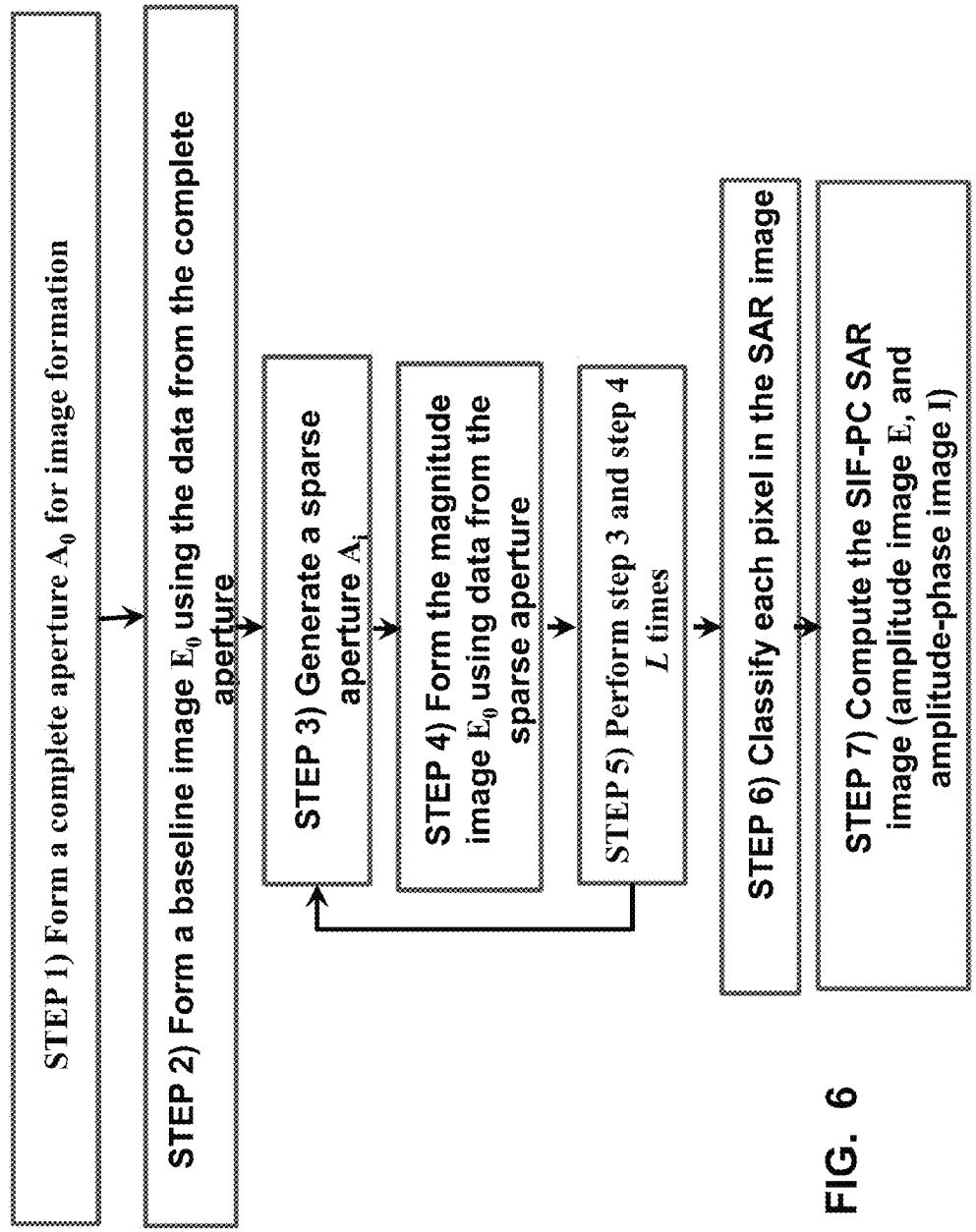

FIG. 6 illustrates the processing steps of a pixel characterization technique.

Figure 7:
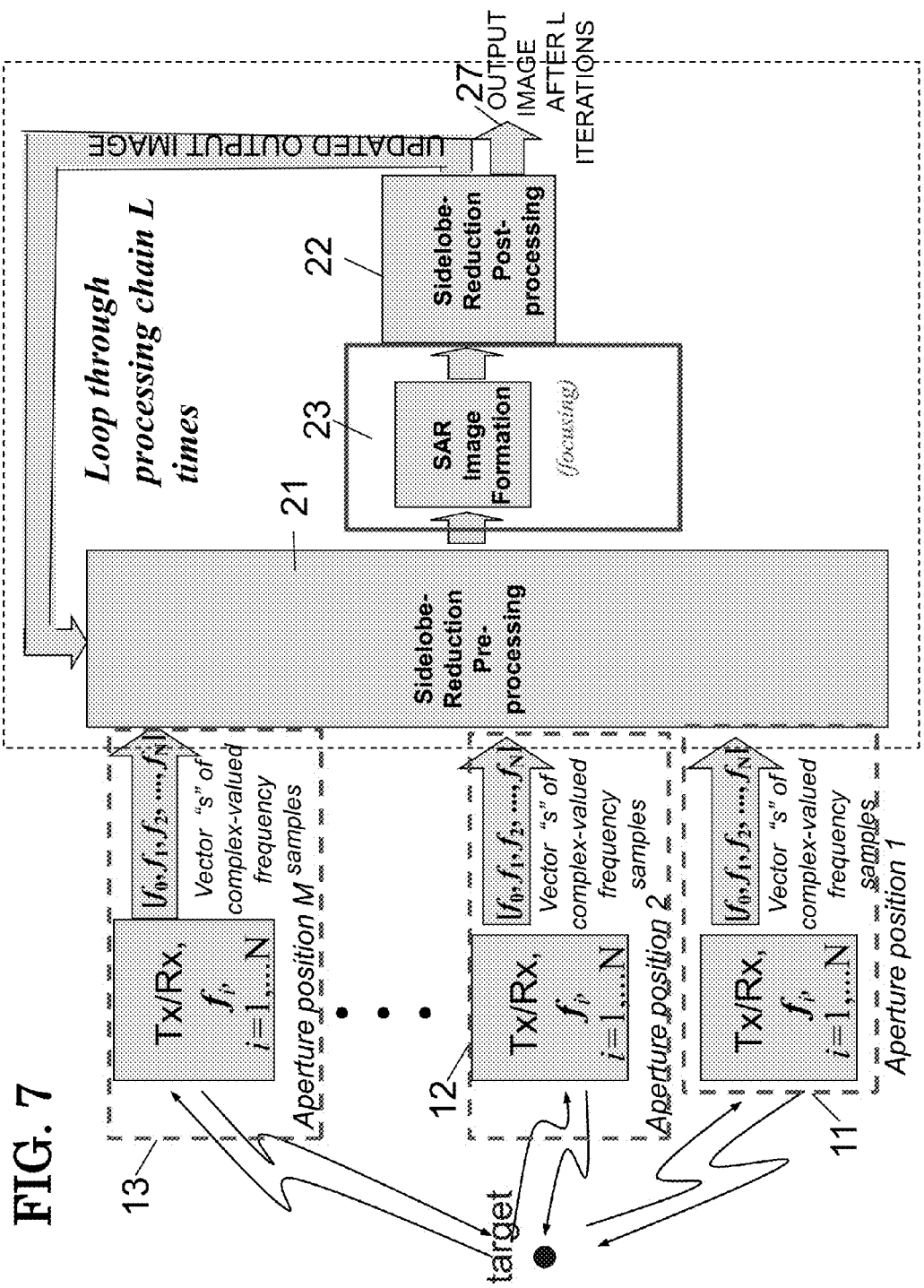

FIG. 7 illustrates a schematic block diagram of preferred embodiment of the present invention.

Figure 8:
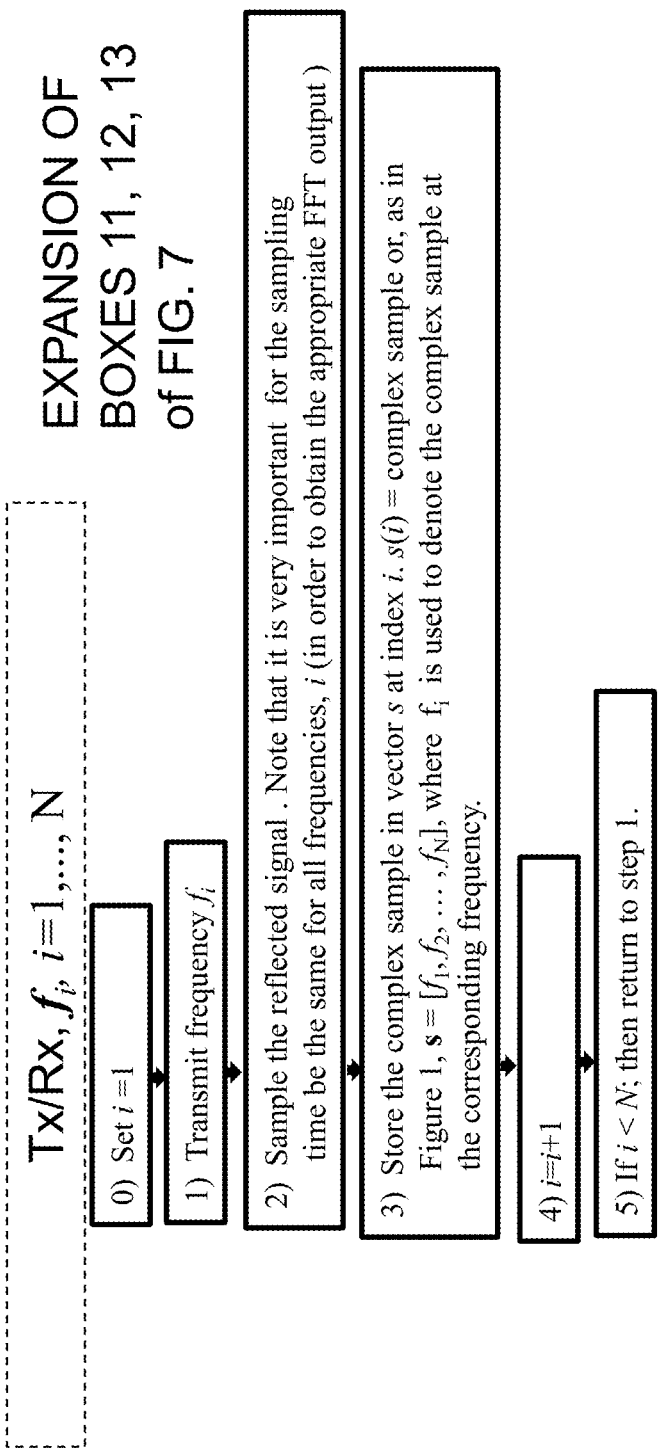

FIG. 8 illustrates a schematic flow chart of steps representing an expansion of boxes 11, 12, and 13 of FIG. 7.

Figure 9:
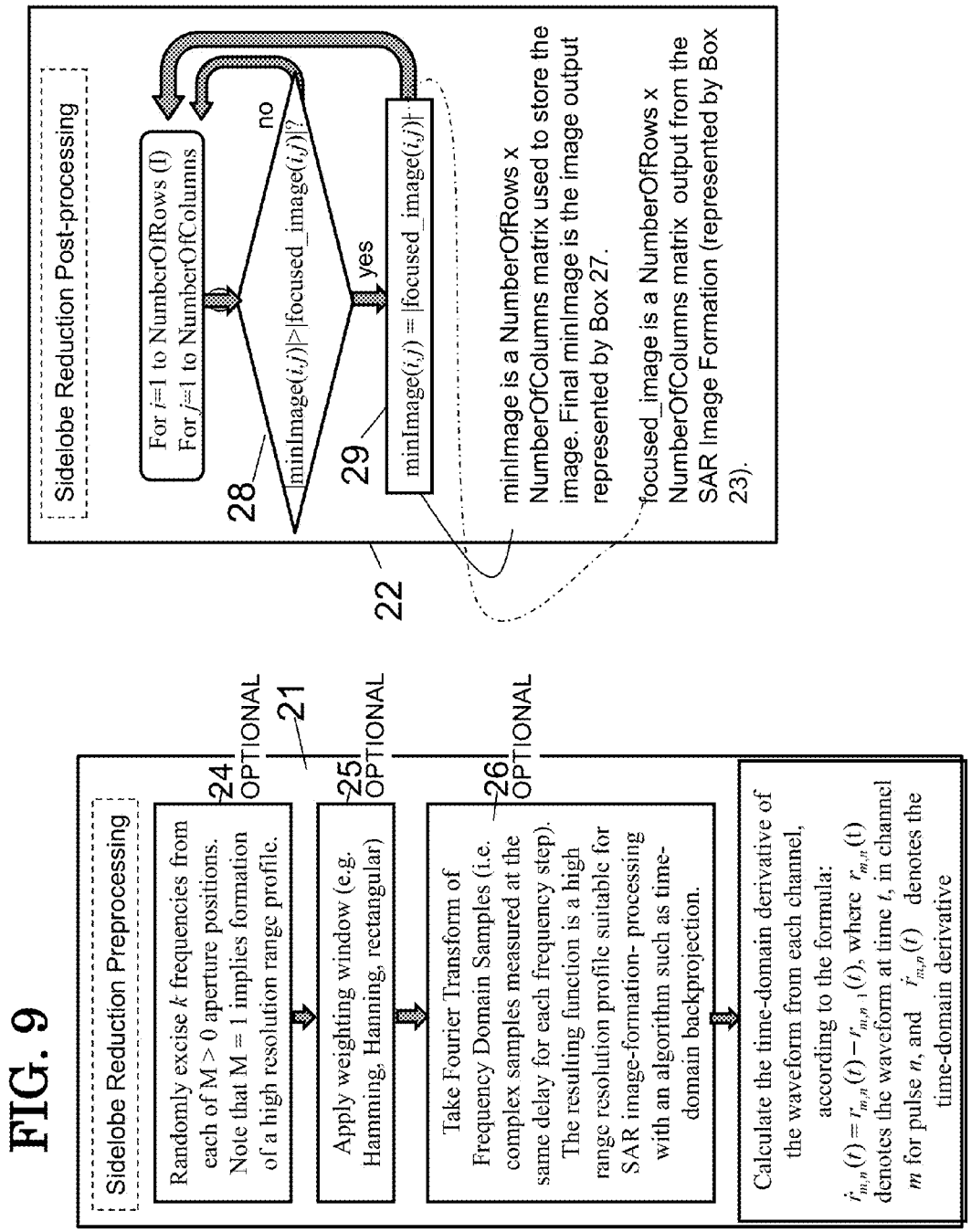

FIG. 9 illustrates an expansion of processing represented by blocks in FIG. 7 comprising Sidelobe Reduction Pre-processing (represented by Box 21) and Sidelobe Reduction Post-processing (represented Box 22). Note that if the process is used only to form a high resolution range profile (i.e. a high resolution signature); then the SAR Image Formation block becomes a 1-Dimensional Fourier Transform and there is a single Tx/Rx box on the left side of FIG. 7.

Figure 10:
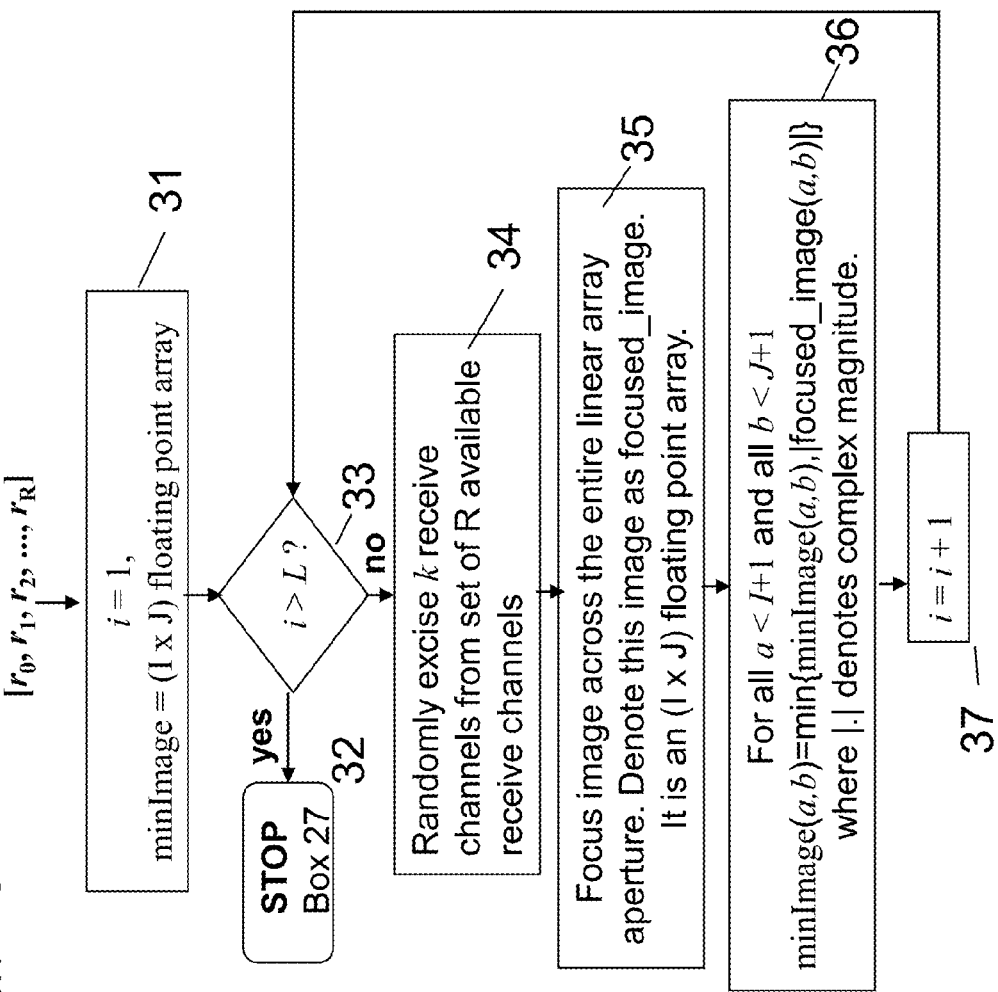

FIG. 10 illustrates a schematic flow chart wherein the output is I×J pixels, L is the total number of iterations, k is the number of receive channels, focused_image is the I×J image that is produced during each iteration, and minImage is the processed image output by the algorithm. Note, also, that the SFRSM forfeits phase information because only pixel magnitudes are compared and saved.

Figure 11:
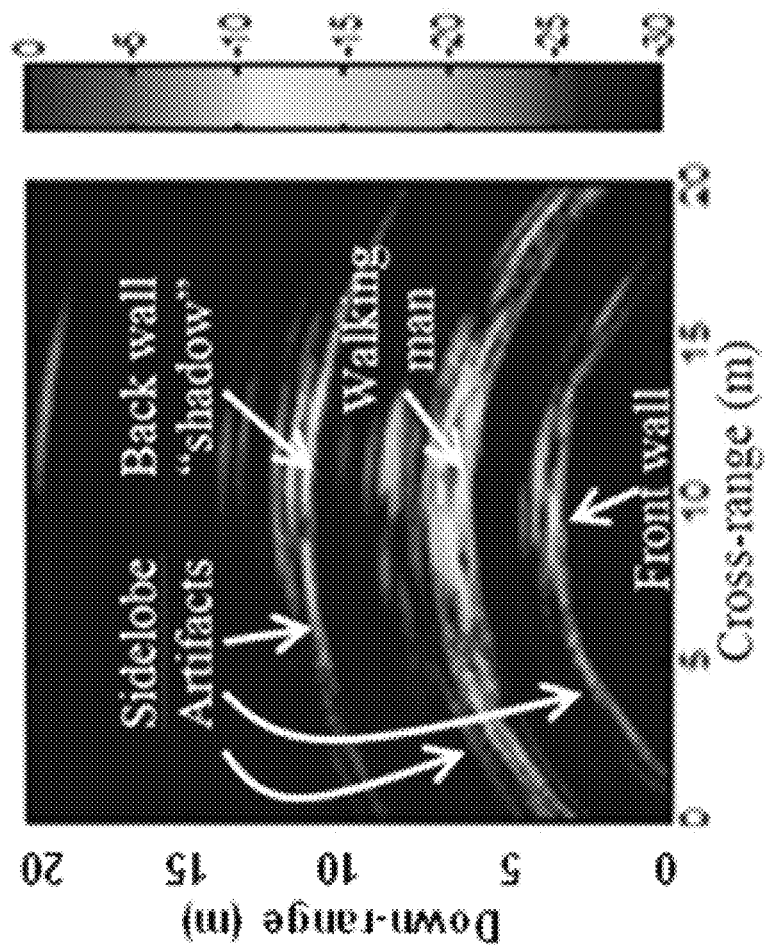

FIG. 11 is an illustration depicting an example of CD image showing a man walking behind a cinderblock wall. The dynamic range of the image is 30 dB (relative to the peak pixel value). The image begins at 8 m (in down-range) from the radar.

Figure 12:
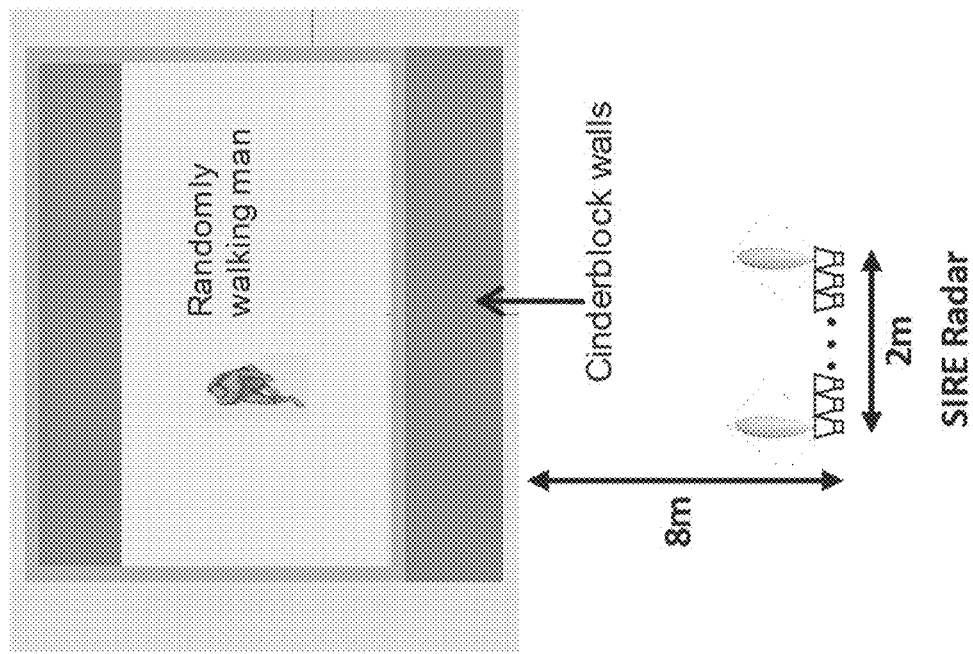

FIG. 12 is a schematic representation of the imaging geometry for the RLA experiments. The walls are cinderblock, and the SIRE system includes 16 receive channels. The two transmitters are located at either end of the receive array.

Figure 13:
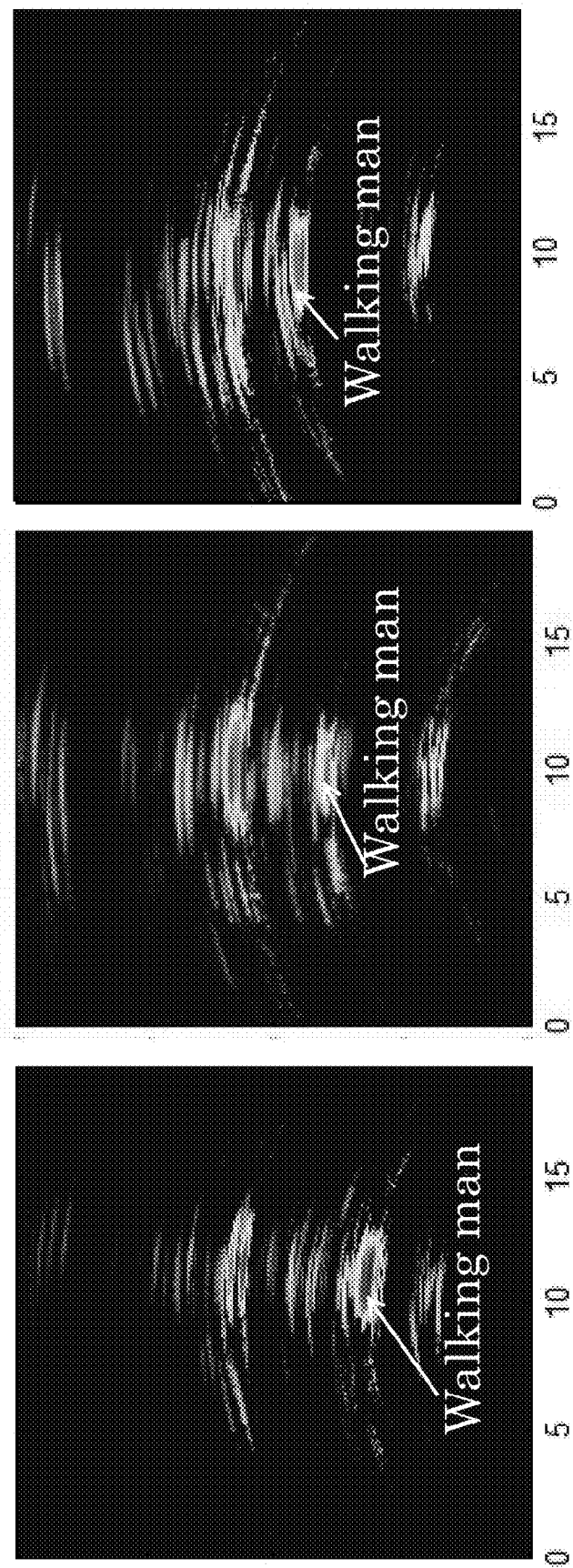

FIG. 13 is an illustration of examples of CD imagery produced by RLA algorithm. Note the absence of the sidelobe "arcs" evident in FIG. 1. The dynamic range of the image is 30 dB (relative to the peak pixel value)—same color scale as FIG. 1.

FIG. 14 is an illustration of ah example of CD image showing a man walking behind a cinderblock wall. The dynamic range of the image is 30 dB (relative to the peak pixel value)—same color scale as FIG. 1.

FIG. 15 illustrates an image showing reduction in sidelobe level (in dB) realized by the RLA processing.

DETAILED DESCRIPTION OF PREFERRED EMBODIMENTS

The invention now will be described more fully hereinafter with reference to the accompanying drawings, in which embodiments of the invention are shown. This invention may, however, be embodied in many different forms, utilized in difference programming languages, and should not be construed as limited to the embodiments set forth herein. Rather, these embodiments are provided so that this disclosure will be thorough and complete, and will fully convey the scope of the invention to those skilled in the art. Like reference numerals refer to like elements throughout the description of the figures.

It will be understood that, although the terms first, second, etc. may be used herein to describe various elements, these elements should not be limited by these terms. These terms are only used to distinguish one element from another. For example, a first layer could be termed a second layer, and, similarly, a second layer could be termed a first layer without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," "left" or right" may be used herein to describe one element's relationship to other elements as illustrated in the Figures. It will be understood that relative terms are intended to encompass different orientations of the device in addition to the orientation depicted in the Figures. For example, if the device in one of the figures were turned over, elements described as being on the "lower" side of other elements would then be oriented on "upper" sides of the other elements. The exemplary term "lower", can therefore, encompass both an orientation of "lower" and "upper," depending of the particular orientation of the figure. Similarly, if the device in one of the figures is turned over; elements described as "below" or "beneath" other elements would then be oriented "above" the other elements. The exemplary terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Recursive Sidelobe Minimization (RSM)

As depicted FIG. 4, radar data is collected from a number of positions. For each position, radar data and the positional data are recorded. A "data point" represents the received signal radar data from each position obtained during an instant or interval in time combined with positional information corresponding to the transmitting and/or receiving position or location. The data points may be collected by either an array of elements or a single moving element which receives data at points in time, or the combination of both; e.g., a physical array of elements with the elements moving over increments of time. The data/collection may be sporadic or at specific intervals of time. As exemplified in FIG. 3, data points are obtained using an array of receiving elements which receive data incrementally. The data points are arranged to form an aperture. As used herein, the term "aperture" means the information or data components used to form an image; which may be for example, an array of data points developed from a scanned area, target or scene which can be used to form an image. In the apertures depicted in FIG. 3, each column represents an interval during which the 1–k elements receive data; each data point representing the image data from the signal received combined with the coordinates of the receiving element. After the data points are established in an aperture (or array), as diagrammatically shown in FIG. 3, a substantial portion of data points are removed from the original aperture (array of data points) to form a "subarray." Conversely, the "subarray" may be formed by the selection of data points within the original aperture. Depending upon the quality of the result desired and the nature of the image being undertaken, the substantial portion of the data points removed or selected may range from as little as one percent to ninety percent. However, one percent removal will result in negligible difference and ninety percent removal will result in drastic reduction of image quality. In general, it is preferred that the percentage of data points subject to removal be within a range of approximately twenty to fifty percent. Using the remaining data points in the aperture, a first preliminary image is formed. During a second interval, the process of removing a different set of twenty to fifty percent of the data points within the original aperture is repeated and a second aperture is formed. In a preferred embodiment, the data points subject to removal are randomly chosen. However, random selection is not necessary to practice the principles of the present invention and some other arbitrary or contrived selection process may be used.

A second preliminary image is formed from the second aperture following the removal of a different set of data points. The first and second preliminary images are then compared. Using the principles of the RSM technique, the magnitude of the signal at each bit-mapped location of the preliminary images is compared. Any pixel having a greater or equal value is discarded, and only the lesser value is used for each bit-mapped location in the merged image. For each subsequent iteration, approximately twenty to fifty percent of the data points are removed to form an aperture and the preliminary image developed therefrom is compared with the previously merged image. The magnitude of the signal at each pixel or bit mapped location is compared and only the lesser value is retained for each bit mapped location in the combined image. This process is repeated iteratively over a series of iterations, which may be for example ten to several hundred iterations. The result is the substantial elimination of noise from the resulting merged image.

Although the technique is implemented and demonstrated for the ultra wide band forward-looking imaging radar (e.g., ARL SIRE), the technique is suitable for used for other image radar as well. The technique may also be applied for the BoomSAR radar, which is a different radar with different configuration (side-looking). Moreover, this imaging technique is not limited to the formation of radar images as it can be applied to other applications such as CAT scans, magnetic resonance, seismic, sonar, and acoustic imaging.

Use of the Recursive Sidelobe Minimization (RSM) technique results in an improvement of image contrast by reducing system noise by a significant level, significantly improving system performance; and can be adapted for use with existing radar systems. Results include the generation of high contrast images produced by significantly reducing the noise level in the system such that very difficult targets or objects (with low amplitudes) in the image can be detected, which otherwise would be embedded in the system noise.

Generally speaking, in any imaging system, the sidelobes from large objects or noisy spots generated by the system may be mistaken as targets of interest. In accordance with the principles of the present invention, the large sidelobes are substantially virtually eliminated, thus reducing the false alarm objects that would be considered as targets of interest.

Possible uses/other than radar imaging include magnetic resonance imaging, CAT scan, sonar imaging, and acoustic imaging.

Recursive Sidelobe Minimization using Compressive Aperture

FIG. 4 shows a preferred embodiment flow chart of the Recursive Sidelobe Minimization (RSM) technique using a compressive aperture which significantly reduces the multiplicative noise in the process of forming a SAR image. As used herein, the term "compressive aperture" refers to an aperture after randomly or arbitrarily selected data points have been removed. FIG. 4 illustrates the following steps:

Step 1A—Radar data and its position information is acquired.

Step 2A—The radar aperture is formed in preparation for image formation. The aperture consists of K elements. Each element in the radar aperture includes the radar receiving position information $(x_R(k), y_R(k), z_R(k))$, the radar transmitting information $(x_T(k), y_T(k), z_T(k))$, and the data record $s_k(t)$ that the radar measures at this location. For side-looking radar, the aperture is usually a linear path with data measured along the path. For the forward-looking radar mentioned above, a 2D radar aperture is generated; formed by the physical antenna array and the forward motion of the radar. Although the terminology "2D" or two dimensional is used to reflect the aperture configuration, the data within the 2D aperture may contain three dimensional information concerning the target area in that the signal data may include the distance at which the target is located relative to the receiving element. In general, the radar aperture may take any of a variety of shapes and those shown are merely examples.

Step 3A—The imaging grid is formed. In a preferred embodiment a rectangular imaging grid is generated although the imaging grid could be arbitrary defined. Each pixel $P_i$ the imaging grid is located at coordinate $(x_P(i), y_P(i), z_P(i))$.

Step 4A—A random compressive aperture is generated using the radar aperture with K elements from step 2A. The compressive aperture is formed by selecting only L elements from the original aperture for the imaging process. The value for L is $$L = p \cdot K, \text{ Where } 0 < p < 1 \tag{6}$$

Accordingly, only a subset of the aperture positions are used for image formation. The remaining K−L aperture positions are simply discarded for this realization. The typical number that we use for our configuration is p=0.8 (i.e., 80% of the aperture is employed and 20% of the aperture is discarded at each iteration). The value of p that can achieve best result should be examined and optimized for each configuration of geometry and radar data set. In a preferred embodiment, the selection of L aperture positions is completely random for each realization. If $A_l$ represents a vector that contains the indices of aperture positions to be included in the image formation process for $l^{th}$ realization, then:

$$A_l = \langle a_{l1}, a_{l2}, \ldots a_{lL} \rangle \quad (7)$$

where $a_{lm}$ is a random number, $l \leq a_{lm} < K$ and $a_{lm} \neq a_{ln}$ for $m \neq n$. (8)

The technique disclosed in the '829 Patent may use a random number generator that produces random numbers with certain distribution. Those of ordinary skill in the art would readily appreciate that there are many types of distributions. The two distributions that are widely employed in practice are uniform (in which all values from a finite set of possible values are equally probable) and Gaussian (in which all values from a finite set of possible values follow the Gaussian distribution that has the shape of a bell curve). Although any random number distribution could be used to realize (7) and (8), a uniform distribution random number generator may be employed in this preferred embodiment. There are many different implementations for generating a uniformly distributed random numbers for use in conjunction with the present invention; including those random number generator routines that are usually defined and included in general purpose computer programming languages. For example, in C programming language the two routines srand( ) and rand( ) are used to generate a random number. First, the srand( ) routine is called to initialize the random number generator. Next, the rand( ) routine is called to generate a random number between 0 and a predefined value RAND_MAX. The following code fragment (C language) demonstrates how to generate 100 uniformly distributed, numbers that have values from 0 to M=1000.

```
seed=9000;    /* choose a seed value */
srand(seed);  /* initialize random number generator */
M=1000;       /* initialize value of M */
For(i=1; i<100 ; i++)
{
/* random1 is a floating-point number from 0 to 1 (not including 1) */
random1= ( (double)rand( )/((double)(RAND_MAX)+(double)(1));
/* random2 is a floating-point number from 0 to M (not including M) */
random2=(double)M* random_1;
/* random3 is an integer number from 1 to M (including M) */
random3=(int)random2+1;
}
```

To generate the vector of random number $A_l$ as described in (7) and (8), one can use the random number generator as shown in the above code, fragment example. Each time a random number is generated, it is compared to the previous ones to ensure that all elements in $A_l$ are unique as specified in (8). Otherwise, another random number is generated to satisfy (8).

It can be readily appreciated by those of ordinary skill in the art that the term "random numbers" as used herein includes numbers generated selectively or arbitrarily. As shown in the foregoing, the selection process may be one of those commonly associated with computer programming, but other number selection processes or arbitrary number selection processes may be utilized to achieve the same or similar results without departing from the principles of the present invention.

FIG. 3 illustrates the original radar aperture and two compressive apertures generated at two different iterations. Each compressive aperture is a subset of the original aperture with gaps (deleted data points) introduced. Since the locations of the gaps in a preferred embodiment are randomly generated, the compressive aperture from $(l-1)^{th}$ iteration is different than the compressive aperture from $(l)^{th}$ iteration. In this preferred embodiment, the randomness of the gap locations is an important feature that enables performance improvement.

Generally speaking, it is hot intuitive as to why only a subset of the original radar aperture is used instead of the full aperture for forming image, since gaps introduced in the subset of an aperture would seem to result in inferior performance. In prior art conventional techniques, one generally prefers the full data set and avoids the gapped data set. However, the benefit of this "subset" approach will be examined later in conjunction with step 7A below.

Step 5A—The image is formed using the compressive aperture generated from step 4A. The compressive aperture derived from $A_l$ with L elements is then used to form the $l^{th}$ realization of the sub-image using the backprojection method as described above.

This results in the $l^{th}$ realization of the sub-image with I pixels in the down-range direction and J pixels in the cross-range direction, where N=I·J $$I_l = \langle P_l(i) \rangle, 1 \leq i \leq N, \quad (9)$$

where $P_l(i)$ is computed using equation (1) with modification, reproduced below:

$$P(i) = \sum_{k \in A_l} w_k s_k(f(i,k)) \quad (1b)$$

Note that in the summation, the values of index k are selected from the random vector $A_l$ defined in (7).

Step 6A—The envelope of the image generated in step 5A is computed. The image generated in step 5A can also be written as:

$$I_l = \langle P_{lj}(i) \rangle, 1 \leq i \leq I, 1 \leq j \leq J \quad (10)$$

where $P_{lj}$ is the $j^{th}$ down-range profile from the $l^{th}$ realization sub-image.

The corresponding quadrature component of this image down-range profile is computed by applying the Hilbert transform filter to the in-phase component $$PH_{lj} = \text{Hilbert}(PH_{lj}) \quad (11)$$

The Hilbert transform filter has magnitude 1 at all frequencies and introduces a phase shift of $$-\frac{\pi}{2}$$

for positive frequencies and $$+\frac{\pi}{2}$$

for negative frequencies. Thus, the Hilbert transform filter is used to shift the real signal (each image down-range profile) by $$\frac{\pi}{2}$$

to generate its quadrature component in order to compute its envelope.

As disclosed in the '829 Patent, in one preferred embodiment using the Hilbert transform filter, the envelope of the $j^{th}$ down-range profile from the $l^{th}$ realization of the image may be computed as:

$$PE_{lj}=\sqrt{(P_{lj})^2+(PH_{lj})^2}.\text{(where the subscript is } ij) \quad (12)$$

The envelope of this image is simply $$I_l = \langle PE_{lj}(i) \rangle, 1 \le i \le I, 1 \le j \le J. \quad (13)$$

Step 7A—An intermediate resulting image is computed. The minimum operator is applied to two images: 1) the intermediate result from previous iteration $(l-1)^{th}$ and 2) the image formed from this iteration. For each image pixel, the values of the two images are compared and the minimum value is selected $$Im_l = \min \langle I_l, Im_{l-1} \rangle, 2 \le l \le M \quad (14)$$

where $Im_l$ is the intermediate resulting image at $(i)^{th}$ iteration. Note that equation (14) is defined for $2 \le l \le M$. For the first iteration (l=1), $Im_0$ is initialized with a very large values, so that the intermediate resulting image $Im_1 = \min \langle I_1, Im_0 \rangle = I_1$.

After step 7A, the algorithm returns to step 4A to continue with the next iteration until the $M^{th}$ iteration is finished. The intermediate resulting image is also sent to the display routine for visualizing the image.

Although in the '829 Patent, the application of the RSM technique for a preferred embodiment configuration (a UWB radar configured in forward-looking imaging mode), this RSM method could be applied to any coherent imaging system where measurements from an aperture of arbitrary geometry (linear, curve, 2-D, or 3-D) are coherently integrated to form a 2D or 3D image.

The '829 Patent includes a code listing representative of the RSM algorithm in Appendix A (hereby incorporated by reference).

Image Formation by Pixel Classification (Based Upon Variation of Pixels Over Iteration Process)

FIG. 1A shows an imaging scenario. The radar is mounted on a vehicle (ground-based or airborne). The radar moves along a path that is formed while the vehicle is moving. Along the vehicle path, the radar transmits signals to illuminate the area of interest located on the side of the radar, captures the return radar data and its position data, and combines the data to form the SAR image of the area. Although FIG. 1A illustrates the radar system that is configured in side-looking mode, the concept of operation is the same for the forward-looking mode. An article by one of the coinventors, Lam Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009 (hereby incorporated by reference) describes the ARL radar operations and processing steps in both side-looking mode and forward-looking mode. FIG. 16 shows the overall SAR system block diagram of a preferred embodiment of the present invention. The return radar signals are first sent to the signal processing subsystem, where a series of signal processing algorithms are performed to suppress much of the additive noise from the radar data, as described further in Lam Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009, hereby incorporated by reference. After the signal processing steps, the processed radar data are sent to the IF-PC imaging subsystem that combines the radar and the position data to form the SAR imagery. The image formation process typically employs standard imaging techniques such as the back-projection algorithm, as described in the publication John McCorkle, Lam Nguyen, "Focusing of Dispersive Targets Using Synthetic Aperture Radar," original ARL-TR-305 August 1994, reprinted March 2010, hereby incorporated by reference, or the range migration algorithm R. H. Stolt, "Migration by Fourier Transform," Geophysics, Vol. 43, No. 1, February 1978, p. 23-48, hereby incorporated by reference. As mentioned in the previous section, although the signal processing steps have performed the suppression of unwanted noise from the return radar data, and the imaging process also provides additional signal-to-noise gain by coherently integrate radar data from many aperture positions, the noise floor in the resulting image is still a major challenge for the detection of smaller targets, especially if these targets are located in the proximity of the sidelobes of the larger objects. We invented an imaging technique (IF-PC) to generate almost noise-free SAR imagery. FIG. 6 shows the processing steps of the IF pixel characterization technique that may be performed by a SAR imaging subsystem.

With reference to FIG. 6, in step 1 the complete aperture $A_0$ for SAR image formation is formed. In this step, the system collects the return radar data, the coordinates of the receiver, and the coordinates of the transmitter for each position k along the aperture of N positions.

The radar data at each position is $$s_k(t), 1 \le k \le N \quad (1A)$$

The coordinates of the receiver at each position is $$(x_R(k), y_R(k), z_R(k)), 1 \le k \le N \quad (2A)$$

The coordinates of the transmitter at each position is $$(x_T(k), y_T(k), z_T(k)), 1 \le k \le N \quad (3A)$$

For monostatic radar that uses the same transmitting and receiving antenna, the coordinates of the receivers $(x_R(k), y_R(k), z_R(k))$ are identical to the coordinates of the transmitters $(x_T(k), y_T(k), z_T(k))$. Since the monostatic radar case is a special case of the bistatic radar configuration, the algorithm described here is applicable for both configurations.

The next step in FIG. 6 is to form a baseline image using data from Aperture $A_0$ generated from step 1 using the standard backprojection algorithm.

In order to form an image from the area of interest, an imaging grid is generated that consists of image pixels.

Each pixel from the imaging grid is located at coordinates $$(x_P(j), y_P(j), z_P(j)), 1 \le j \le M \quad (4A)$$

The imaging grid is usually defined as a 2-D or 3-D rectangular shape. In general, however, the image grid could be arbitrary.

The backprojection value at $j^{th}$ pixel is computed as $$P_{0j} = \frac{\sum_{k=1}^{N} w_{0k} \cdot s_k(f(k,j))}{\sum_{k=1}^{N} w_{0k}}, \ 1 \le j \le M, \qquad (5A)$$

$P_{0j}$ is the value of $j^{th}$ pixel formed using the complete aperture $A_0$. In equation (5A), by assigning the value of $w_{0k}$ to be either 0 or 1, the weighting factors $w_{0k}$ define which aperture positions contribute to the formed image. In this case, since we want to form an image using all of the TV aperture positions of $A_0$, each weighting factor has the value of 1 as follows:

$$w_{0k}=1, 1 \le k \le N. \qquad (6A)$$

The delay (shift) index (f(k,j)) in equation (5A) is computed based on the round-trip distance between the transmitting element, the image pixel, and the receiving element. The distance between the $k^{th}$ transmitting element and the $j^{th}$ image pixel is $$d_1(k,j) = \sqrt{[x_T(k)-x_P(j)]^2 + [y_T(k)-y_P(j)]^2 + [z_T(k)-z_P(j)]^2}. \qquad (7A)$$

The distance between the $k^{th}$ receiving element and the $j^{th}$ image pixel is $$d_2(k,j) = \sqrt{[x_R(k)-x_P(j)]^2 + [y_R(k)-y_P(j)]^2 + [z_R(k)-z_P(j)]^2} \qquad (8A)$$

The round trip distance is $$d(k,j)=d_1(k,j)+d_2(k,j) \qquad (9A)$$

The delay index is $$f(k,j) = \frac{d(k,j)}{c} \qquad (10A)$$

The baseline image using the data from the baseline (complete) aperture $A_0$ is $$I_0 = \langle P_{0j} \rangle \qquad (11A)$$

The image $I_0$ is a bipolar (contains both positive and negative values) image that includes both amplitude and phase information. The corresponding envelope image $E_0$ is computed by computing the Hilbert envelope of $I_0$. The procedure to compute the envelope image is described in Nguyen, "Signal and Image Processing Algorithms for the U.S. Army Research Laboratory Ultra-wideband (UWB) Synchronous Impulse Reconstruction (SIRE) Radar," ARL Technical Report ARL-TR-4784, April 2009.

$$E_0 = |\text{Hilbert}(I_0)| \qquad (12A)$$

Referring again to FIG. 6, the third step comprises generating a spare aperture from the complete aperture of N positions $A_0$ generated from the second step.

$$A_i, 1 \le i \le L \qquad (13A)$$

where L is the number of iterations that the algorithm computes.

The sparse aperture $A_i$ is a subset of the complete aperture $A_0$. This sparse aperture only consists of K positions that are randomly selected from N positions in $A_0$, where K=p·N, and 0<p<1. The typical value for p=0.8. In this example, the value of p=0.8 means that instead of using all of the positions from aperture $A_0$ for imaging, only 80% of the aperture positions are employed during the imaging process for this iteration. It is beneficial that the selection of K positions from N positions be completely random, since this step is only one put of L iterations that the preferred embodiment pixel characterization technique will perform, as will be explained later.

One approach to implement this, sparse aperture is to generate a random vector for this $i^{th}$ iteration:

$$w_{ik}, 1 \le k \le N \qquad (13AA)$$

where the value of $w_{ik}$ is either 0 or 1. There are K elements of $w_{ik}$ having the value of 1, and (N–K) elements of $w_{ik}$ having the value of 0.

Referring again to FIG. 6, the fourth step comprises forming the magnitude image $E_i$ using data from the sparse aperture $A_i$ (from step 3) and the backprojection algorithm (described in step 2).

First, the bipolar image using the data from the sparse aperture is computed as:

$$I_i = \langle P_{ij} \rangle \qquad (14A)$$

From equation (5), the backprojection value at $j^{th}$ pixel using the sparse aperture $A_i$ is computed as $$P_{ij} = \frac{\sum_{k=1}^{N} w_{ik} \cdot s_k(f(k,j))}{\sum_{k=1}^{N} w_{ik}}, \ 1 \le j \le M \qquad (15A)$$

Note that equation (15A) is the same as equation (5A), except that the subscript 0 of $P_{0j}$ and $w_{0k}$ in (5A) has been replace by i in (15A). From equation (15A), although the summation is performed from 1 to N, only data from K aperture positions are contributed to the final value of the image pixel since $w_{ik}$, generated from equation (13A) only contains K non-zero elements. Also note that the value of the denominator $\Sigma_{k=1}^{N} w_{ik}$ in equation (15A) represents the number of non-zero elements. This value is used as normalization factor for the final image pixel value.

The magnitude image $E_i$ using data from aperture $A_i$ is then computed from the bipolar image $I_i$ as described in step 2.

$$E_i = |\text{Hilbert}(I_i)| \qquad (16A)$$

Referring again to FIG. 6, the fifth step of a preferred embodiment comprises the repeating of the third and fourth steps for L iterations (1≤i≤L).

Referring again to FIG. 6, the sixth step of a preferred embodiment comprises classifying each pixel in the SAR image based on the statistical distribution of its amplitude across L iterations. There are two possible classes: 1) target class that includes the pixels that are originated from physical objects (main lobes), or 2) noise class that includes the pixels originated from some artifact sources (noise, sidelobes).

For each $j^{th}$ pixel in the image grid, the decision statistic is the standard deviation of the amplitudes of the pixel $P_{ij}$ across L iterations, and this standard deviation normalized by the mean value of the amplitudes.

$$d_j = \frac{\sqrt{\frac{1}{L} \Sigma_{i=1}^{L} (P_{ij}-\overline{P_j})^2}}{\overline{P_j}}, \ 1 \le j \le M, \qquad (17)$$

where $$\overline{P_j} = \frac{1}{L} \Sigma_{i=1}^{L} P_{ij}, \ 1 \le j \le M. \qquad (18)$$

The decision statistic described in equation (17) represents the fluctuation (or randomness) of the amplitude of a pixel across L iterations.

Referring again to FIG. 6, the seventh step comprises computing the pixel characterization SAR image (both magnitude and complex) based on the decision statistics from step 6.

First, a binary image is generated based on the decisions statistics computed from equation (17). Each $j^{th}$ pixel in the binary image has a value of 0 (to represent non-target pixel) if its decision statistic $d_j$ is greater than a threshold T, and 1 (to represent target pixel) otherwise.

$$Eb = \langle Pb_j \rangle, 1 \leq j \leq M \qquad (18)$$

where $$Pb_j = 0, \text{ if } d_j > T,$$

$$Pb_j = 1, \text{ if } d_j \leq T.$$

The binary image contains NZ non-zero elements, Z zero elements. The total number of the pixels in the image is M=NZ+Z.

The resulting magnitude image is computed as $$E = \langle P_j \rangle, 1 \leq j \leq M \qquad (19)$$

where $$P_j = 0, \text{ if } d_j > T,$$

$$P_j = \max(P_{ij}), 1 \leq i \leq M, \text{ if } d_j \leq T.$$

Since most of the pixels in the image are classified as non-targets, this would generate a very low noise floor in the resulting SAR image. The remaining pixels are classified as targets. Each of these pixels will have the maximum value across many iterations. Thus, the technique virtually wipes out the noise floor that includes the sidelobes, and maximizes the responses from the targets.

The resulting magnitude image of equation (19) is not a complex image. That means the phase information is not preserved in the image. The amplitude feature is probably the most important one in SAR imaging, especially for the detection of difficult targets in the noisy environment. However, in some cases, it is desirable to exploit the phase information from the targets.

The pixel characterization technique of this preferred embodiment also generates a complex SAR image that includes both amplitude and phase information. From the above equations, the bipolar baseline SAR imagery $I_0$ is generated. This is a bipolar SAR image that includes both amplitude and phase information. However, the baseline SAR image $I_0$ is contaminated with noise and sidelobes. In the binary image Eb from equation (18), the algorithm classifies each pixel in the image into either non-target class or target class. Using this binary image, we can remove the noise floor in the baseline SAR image $I_0$.

The resulting bipolar (complex) SAR image that includes both amplitude and phase information is computed as $$I = \langle P_j \cdot Pb_j \rangle, 1 \leq j \leq M \qquad (20)$$

where $Pb_j$ is the binary pixel as defined in equation (18).

The results of the simulation data of the basic concept of SAR imaging show the performance of pixel characterization technique of this preferred embodiment. A simulation data set was generated using the following scenario. The radar travels along a linear path, transmits impulse signals to the side of the vehicle (perpendicular to the path of the vehicle) and captures the return data. Along the path, the radar also records its coordinates at every transmit/receive cycle. The coordinate measurement also introduces errors in the measurement data. There are four point targets in the scene. The data received by the radar is contaminated with additive white noise that is due to system external RFI sources.

The SAR image generated from the return data using the standard backprojection image formation algorithm. Although the SAR image formation improves the SNR by the integration across the aperture, the additive noise level is still very high in the SAR image. In addition, the severe sidelobes from the large targets are much more challenging. The energy from the main lobes of the large targets spreads to the surrounding area. The error from the measured radar position data causes the leaking of the energy from the main lobes. The limitation of the aperture length is the main source of the uncancelled sidelobes.

The signal processing system is currently realized in the Matlab programming environment, but is not limited to Matlab programming. It is intended for moving target indication (MTI) radar systems using an antenna array to achieve beam-steering. A preferred embodiment of the invention comprises coherent processing of signals measured by a random subset of all available receive channels in the array, thereby introducing the concept of the concept of a "random array". Several realizations of the "random array" are realized and combined via non-linear data processing operations to achieve a reduction in azimuth sidelobe levels. The stopping criterion (i.e. the number of "random array" realizations) is set based on the experience of the operator.

Iterative Fourier Side Lobe Reduction for Steeped Frequency Synthetic Aperture Radar Recursive sidelobe minimization (RSM) has been applied extensively to data sets in which no constraints have been placed on the amount of transmitted bandwidth. That is, no frequency notching was required prior to transmission of the waveform. This is an extension of the earlier RSM technique designed to reduce the artifacts introduced by frequency notching. Results obtained applying the technique to both simulated and measured data are described in the accompanying Figures.

A block diagram of a preferred embodiment and processing methodology is implemented in a synthetic aperture radar (SAR) system is shown in FIG. 7, wherein a dashed box indicates the general location of the improved sidelobe reduction pre-processing algorithm, the sidelobe reduction post-processing algorithm, and the iterative processing procedure indicated by the I-iteration loop in the diagram. Note that the SAR image formation algorithm, as described in, inter alia, U.S. Pat. No. 7,796,829, indicated by a solid rectangle 23 within the larger dashed rectangle 10, remains an integral part of the enhanced formulation; hence, the invention could be incorporated into any stepped-frequency SAR image formation process, without departing from the scope and spirit of the invention.

The Iterative Fourier Side Lobe Reduction for Stepped Frequency SAR methodology substantially reduces the severity of sidelobe artifacts due to the elimination of n of the N frequencies comprising the stepped frequency waveform. It is derived in part from a novel application of concepts from the theories, referenced in H. C. Stankwitz, R. J. Dallaire, and J. R. Fienup, "Nonlinear apodization for side lobe control in SAR imagery," *IEEE Trans. Aerosp. Electron. Syst.*, Vol. 31, No. 1, pp. 267-279, January 1995, here by incorporated by reference, and Emmanuel Candes, Justin Romberg, and Terence Tao, Robust uncertainty principles: Exact signal reconstruction from highly incomplete frequency information. (IEEE Trans. on Information Theory, 52(2) pp. 489-509, February 2006), hereby incorporated by reference. Although the present invention bear some similarity to U.S. Pat. No. 7,796,829 to Nguyen (hereinafter '829 Nguyen Patent), the preferred embodiment methodology addresses a problem that is fundamentally different than that addressed in the '829 Nguyen Patent. The problem formulation of '829 Nguyen Patent concentrated on artifacts observed when the entire transmitted bandwidth is available. The present invention concentrates on, inter alia, artifacts induced by limiting the allowed transmission frequencies to a subset of the available band (i.e. "notching out" specific frequency steps).

FIG. 7 is a block diagram of a preferred embodiment methodology, and its relation to the current image formation paradigm. FIG. 7 provides a pictorial representation of how the processing modifies the earlier SAR processing chain. The dashed line labeled 10 encloses the SFRSM processing loop, while the solid box 23 within the dashed line encloses the SAR image formation step.

The processing steps denoted as "Sidelobe-Reduction" processing in FIG. 7 are described in more detail by the flowchart in FIG. 10.

Referring to FIG. 10, for each value of the loop counter, i, from 0 to L−1, the algorithm first selects a random subset of frequencies from those available after notching (k out of N−n). It then calculates HRR profiles for each of the SAR aperture positions, using the k randomly selected frequency samples, and creates a SAR image, denoted "focused_image." The complex magnitude of each pixel in focused_image is next compared with the magnitude of the corresponding pixel in minImage. If the pixel value in focused_image is smaller than that in minImage or if the value of i equals 0, then the current pixel value in minImage is replaced by the pixel value in focused_image. The effectiveness of this approach rests on the basic tenet that those contributions to image pixel values due to true objects within the image should remain consistent, regardless of the frequency steps excised. Since certain sidelobe patterns may cause small targets to be overwhelmed by nearby larger targets, the minimum value obtained from several different sidelobe configurations (i.e. several different SFRSM frequency sets) should represent a better estimate of the true underlying image pixel value. Once the extraneous sidelobe energy has been removed, what remains should represent the true underlying image pixel value.

FIG. 8 is a schematic expansion of the steps represented pictorially by boxes 11, 12, and 13 in FIG. 7. Following completion of these steps, the vector s contains a set of frequency samples collected at the same time instant. These represent a Transformed version of the desired time-domain signature. Hence, by taking a Fourier transform, one can obtain the desired time-domain signature. Note that the direction of the FFT does effect the nature of the time-domain signature, and it will be determined by the sweep direction (ascending or descending) of the transmitted frequency steps. An Inverse FFT for ascending frequency steps and a forward FFT for descending frequency steps is utilized.

Referring now to FIG. 9, one can see that the preprocessing box depicted in FIG. 7 comprises: (i) random excision of k randomly selected frequency steps from the N−n steps available after transmission restriction, (ii) weighting of the remaining samples (iii) calculation of the high resolution time-domain signature via an FFT. Similarly, the postprocessing box comprises a pixel-by-pixel comparison of the magnitude of the current image with the minimum value calculated for that pixel up to the current iteration. The smallest value in this comparison becomes the new minimum value stored at those pixel coordinates. Finally, as shown in these figures, the process terminates after L iterations.

Referring now to FIG. 10, preferred embodiment system implements an iterative procedure that achieves results by excising a different set of randomly selected frequencies at each iteration. In what follows, it is assumed that N−n of the available frequencies must be excised due to restrictions from a regulating authority, and (as a result) cannot be transmitted. The k frequencies to be excised by the algorithm are selected from this reduced set. It is noted that during the data collection, restricted frequencies (set by the FCC) are eliminated prior to transmission; i.e., only the "allowed" frequencies are received and transmitted. Thus the frequency samples inputted into Box 31 comprise a received complex signal at each low resolution range gate. In Box 31, the system initializes the output array (minImage) and the looping variable (i). Note that all pixel values in minImage in Box 31 are initially set to extremely large values (effectively, +∞). In diamond 33, the number of iterations are set at a number L, and if the iteration count i is not greater than L, the steps in Boxes 34-37 are repeated. A larger L results in better output imagery; at the expense of increased computational time. As an example, the value of L may be selected as 20. In Box 34, k of the available n frequencies are randomly selected and the complex samples collected, at these frequencies (at each of the M aperture positions) are set to zero (effectively removed). In Box 35, the high resolution signature (via the FFT) is formed and the SAR image is created using a suitable focusing algorithm. This yields an (I×J) complex 2D image. In classical SAR imaging (e.g. airborne collection assets) the aperture is 1D, but it can also be 2D (e.g. an antenna array, mounted on an SUV, that moves forward and creates a radar picture of the road in front of it). In Box 36, the complex magnitude of each pixel is determined in the newly formed SAR image. These values are compared with the corresponding pixel value in the output array. A value is replaced in the output array if the newly calculated value is smaller than the current output value.

Randomized Linear Receive Array Overview

Classical narrowband MTI systems often operate in the Range-Doppler domain under the assumption that targets are located kilometers from the radar platform. This assumption allows wave fronts at the receive array to be considered planar and enables beam-steering to be performed via a linear phase adjustment across the array. Since the SIRE radar operates at close range, however, this plane-wave assumption is no longer valid. In addition, the SIRE system's unique processing architecture makes it particularly well-suited to time-domain, rather than Doppler-domain, processing. These system attributes, combined with the low velocity of the targets to be prosecuted, lead us to implement an MTI approach based on a change detection (CD) paradigm. The resulting time-domain approach has proven to be extremely effective for detecting slowly moving targets as part of the STTW application.

As an initial MTI processing step, a time-domain, back-projection algorithm is used to focus energy within the scene using one frame of data, where a frame comprises measurements from the pair wise combination of transmit and receive channels for a single sequence of transmit pulses. From the above referenced patent applications, recall here that: (i) the SIRE system includes two transmit and 16 receive channels and (ii) the transmitters fire in an alternating sequence. Thus, each frame of data contains 32 measurements at each available downrange location. The back-projection algorithm combines all of this information to produce an output image for each frame, and pairs of images from adjacent frames are then coherently subtracted to produce the final MTI image as summarized by $$I_k(x, y) = \sum_{i=1}^{16} \sum_{j=1}^{2} g(r_{i,j}) f_{i,j,k}(r_{i,j}) \text{ and} \quad (1B)$$

$$\Delta_k(x, y) = I_{k+1}(x, y) - I_k(x, y), \quad (2B)$$

where $r_{i,j}$ represents the range gate from transmitter j and receiver i corresponding to image pixel (x,y), $g(r_{i,j})$ represents a weighting function, $f_{i,j,k}(r_{i,j})$ represents the raw data from transmitter j, receiver i, and time index k at range; gate $r_{i,j}$, $I_k(x,y)$ represents the image pixel at coordinate (x,y), and $\Delta_k$ is the CD image used for MTI processing.

Although, the subtraction step in (2B) suppresses much of the background clutter, certain MTI imaging artifacts still remain, as evidenced by FIG. 11. The scenario for this data collection comprised a lone man walking in a structure with cinderblock walls. The necessary data were collected by the stationary SIRE radar and then filtered to the 500 MHz-1500 MHz frequency band prior to image formation. The sidelobes associated with various objects are clearly visible in FIG. 11. These effects will be mitigated via the introduction of randomized linear array processing.

Randomized Linear Array (RLA) Processing

Randomized array processing is, at its core, an adaptation and extension of recursive sidelobe minimization (RSM) algorithm developed for synthetic aperture radar (SAR). There is, however, a difference in implementation. While the earlier RSM algorithm required a moving platform and two-dimensional synthetic aperture as part of its image formation and sidelobe reduction procedures, only the one-dimensional aperture afforded by the linear receive array is required. This is due to the high degree of clutter cancellation achieved through MTI CD processing, which effectively eliminates the background clutter returns competing with both targets and sidelobe artifacts.

The description of the RLA algorithm begins by noting that it is an iterative process. During each iteration of the RLA algorithm, a different, randomly selected subset of receive channels is removed from the complete set available for MTI image formation. After the algorithm completes its first iteration, the complex magnitude of the newly created CD image (i.e. the magnitude image) is saved. This magnitude image then becomes our output CD image. During subsequent iterations we compare each pixel of the current CD image with the corresponding pixel of the output CD image. If the current magnitude is smaller than the output magnitude, then we replace the output value with the current one. This procedure is repeated until either a predetermined number of iterations have been performed or no further changes in output pixel values are observed.

The procedure is summarized below for a fixed number of iterations:

1. Determine the number of iterations, N and initialize the output image variable, O.
2. Randomly generate Assets of M indices to be excised.
3. Form N coherent-difference CD images using the N sets of (N−M) indices selected in #2.
4. Calculate the output image according to:

$$O(x, y) = \min_{m} \{ |\Delta_{k,m}(x, y)| \} \quad (3B)$$

where $1 \leq m \leq N$ corresponds to a particular set of deleted receive-array, elements and $\Delta_k(x,y)$ is defined in (2).

Since the sidelobe pattern in $\Delta_{k,m}(x,y)$ varies from one realization to the next, the operation in (3B) suppresses the overall sidelobe response. The target (mainlobe) response, however, remains consistent for all realizations (see (1) and (2)); hence, it is not attenuated. From these observations it becomes clear that the minimum in (3) is the mechanism whereby the RLA algorithm can produce higher-quality CD imagery.

It is worth noting that the same set of random indices must be used for each constituent image of the CD difference (i.e. $I_k(x,y)$ and $I_{k+1}(x,y)$). The use of different indices would result in different sidelobe patterns, and the output CD image would be destroyed.

RLA-Generated CD Imagery

The effectiveness of the proposed RLA approach is illustrated in FIG. 13. To generate this image, we set N=100, and M=5 in step #3 above, and we used data from the same SIRE radar data collection used to generate the CD image in FIG. 11. In this scenario the test subject walked randomly inside a structure with cinderblock walls while the stationary SIRE radar collected data with the axis of its receive array parallel to the front wall of the building. The data collection configuration is illustrated in the diagram in FIG. 12. More specific details regarding the experiment are provided in A. Martone, K. Ranney, R. Innocenti, "Through-the-wall detection of Slow-moving Personnel," in Proceedings of SPIE, vol. 7308, (2009), hereby incorporated by reference.

In the image of FIG. 13, one can immediately see that the sidelobe "arcs" present in FIG. 11 are largely eliminated. This observation is confirmed by the imagery in FIG. 14, which shows the non-RLA images corresponding to the RLA images in FIG. 13. The color scales and data collection geometry used to generate this imagery is the same as that used to generate the imagery in FIG. 11.

The relative reduction in sidelobe level (in dB) obtained using the RLA processing have been calculated and the results are shown in FIG. 15 for the previously considered test images. In order to better visualize these results, a floor of −15 dB was selected and set all pixels in the image below −15 dB to 15 dB. From the images in FIG. 15, it can be seen that a reduction in sidelobe level in excess of 15 dB is possible. Such reductions should translate readily to a reduction in false alarms.

In summary, described herein is a new procedure for reducing the number and severity of artifacts in moving target indication (MTI) imagery. In particular, as described in the foregoing, this randomized linear array (RLA) algorithm can effectively eliminate many of the sidelobes produced by objects within an area under surveillance. The effectiveness of the new technique has been documented, leveraging available sensing-through-the-wall data collected with the Army Research Laboratory's (ARL's) low-frequency, ultra-wideband, synchronous impulse reconstruction (SIRE) radar system. Results indicated that, at certain MTI image pixels, a reduction in sidelobe level in excess of 15 dB is realized. Such reductions could translate readily to a reduction in false alarms. Higher quality input MTI imagery could only aid downstream processing.

The present invention is similar to ARL patents/invention disclosures ARL-08-48 and U.S. application Ser. No. 13/046, 250 entitled "System and Method for Iterative Fourier Side Lobe Reduction, filed Mar. 11, 2011 (ARL 09-20CIP), hereby incorporated by reference. However, the present invention reformulates and extends certain salient concepts for application to the MTI problem. This new formulation is then realized via introduction of the "random array".

One concept of the design is to randomize the receiver array to reduce: azimuth sidelobes in moving target indication (MTI) radar imagery. This is similar to the sidelobe phenomenon observed in synthetic aperture radar (SAR) processing. MTI processing effectively reduces background clutter levels, but moving targets still cast azimuth sidelobes that can produce false alarms in downstream moving target detection algorithms. By combining data measured by a randomly selected subset of the available receive channels; however, the location of nulls can effectively be altered in the resulting beam pattern. Considering a minimum of several such realizations enables reduction of target sidelobes while preserving the target mainlobe response.

The concepts of the present invention have been applied to moving target indication data collected by ARL's synchronous impulse reconstruction (SIRE) radar; where sidelobe level reductions in excess of 15 dB have been observed.

Many beam-steering techniques rely upon a plane-wave assumption; that is, the targets are far enough from the receiver array that the impinging wavefronts emanating from them can be considered to be planar. In this case, array tapering can be used to reduce the azimuth sidelobe levels. This fundamental assumption is not true, however, at close ranges. Modern sense-through-the-wall (STTW) radar systems (such as the SIRE radar, in one of its configurations), often operate at standoff ranges of less than 100 m. In such cases, wavefront curvature cannot be ignored, and our invention can reduce sidelobe levels in these systems because it does not require any assumptions regarding the nature of the measured signal. A plane-wave assumption is not necessary. The "random array" system fits neatly in-line with the existing beam-forming algorithms, including delay-and-sum algorithms operating entirely in the time domain.

A preferred embodiment of the present invention may be incorporated into military systems. For example, the ARL SIRE radar system provides an ideal implementation platform, due to its multi-element receiver array. In a stationary mode of operation, the SIRE allows a user to observe the movements of subjects obscured by building walls. A target with a large reflectivity (radar cross section (RCS)), however, will introduce azimuth sidelobes, causing false alarms to be produced by both manual- and automatic target detection (ATD) algorithms. The invention eliminates potential false alarms by severely reducing sidelobes produced by the moving target. As a result, the user will be less likely to see a target where there is none, and downstream tracking algorithms will be more likely to maintain track on a target of interest.

Many military systems currently under development also utilize an array of receivers, and these systems could benefit from incorporation of this invention. Examples of such systems include the vehicle-borne radars under development at both SRC and AKELA; incorporation of the invention into their MTI processing chains should be relatively straightforward. Preferred embodiments of the present invention do not require use of a specific beam-steering algorithm.

In addition, a network of closely spaced, unattended ground sensors (UGS) with synchronized radars could also leverage the invention. In this case the individual network sensors are assumed to operate in concert, realizing gains through coherent summation measured target responses. Coordination between the various sensors would be required to implement this mode of operation. Additionally, any sensor system leveraging an array of receivers, such as a sonar array, could also incorporate the invention.

The present invention would also benefit any similar commercial radar system that employs an array of receivers. In particular, the invention would benefit any eventual use of a moving target indication (MTI) radar system that might be used for law enforcement (e.g. hostage rescue, etc.) and first responder (e.g., finding/tracking moving persons during a fire) applications.

As used herein, the terminology "transmitter receiver" or "transmitter-receiver" means an assembly or combination of assemblies which receive and transmit electromagnetic signals.

The term "bitmap" is derived from a mapped array of bits, and bitmapped and pixmap refer to the similar concept of a spatially mapped array of pixels. The term "bitmapped" as used herein encompasses pixmap. The term "bitmapped" means a set of bits that represents a graphic image, with each bit or group of bits corresponding to a pixel. As used in the following claims, the term "bitmapped" encompasses all images formed using pixels. For example, all images acquired by digital cameras and camcorders, scanners, and screen capture programs are bitmapped images.

As used in the following claims, the term "processor" means one or more processing units, central processing units, processor cores, microprocessor(s), digital signal processor(s), multiprocessor, computer, programmable controller, programmable chip, multiprocessor, personal computer, CPU, coprocessor, central processor, or the like. The processors, computers, and/or controllers may be connected together or to other circuitry in a manner known to those of ordinary skill in the art.

As used in the foregoing claims, the terminology "area" as in target area includes object(s), person(s), setting, place, or scene. For example, "scanning an area" includes scanning an object or objects, person or persons, place or scene. The terminology positional data includes but is not limited to spatial information relating to location.

As used herein and in the following claims, the terminology "data point" "data point" represents the received signal radar data from each position obtained during an instant or interval in time combined with positional information. The positioning information may, for example, correspond to the transmitting and/or receiving position or location. The data points may be collected by either an array of elements or a single moving element which receives data at points in time, or the combination of both; e.g., a physical array of elements with the elements moving over increments of time. The data collection may be sporadic or at specific intervals of time. As exemplified in FIGS. 2 and 3, data points are obtained using an array of receiving elements which receive data incrementally. The data points are arranged to form an aperture.

As used herein, the term "aperture" means the information or data components used to form an image; which may be for example, an array of data points developed from a scanned area, target or scene which can be used to form an image. In the apertures depicted in FIG. 3, each column represents an interval during which the 1–k elements receive data; each data point representing the image data from the signal received combined with the coordinates of the receiving element.

Further, the terminology "aperture" refers to the collection of K data records along the path (or aperture) of travel of the emitting radar or signal source. In general, the aperture could be a line, a curve, a circle, or any arbitrary shape. The receiving element k from the aperture is located at the coordinate. For bistatic radar (the transmitting antenna is separate from the receiving antenna) the transmitting element k from the aperture is located at the coordinate. For monostotic radar (the transmitting antenna is the same as or co-located with the receiving antenna) the transmitting coordinates would be the same as the receiving coordinates. Since the monostatic radar case is a special case of the bistatic radar configuration, the algorithm described here is applicable for both configurations. The returned radar signal at this receiving element k is. In order to form an image from the area of interest, we form an imaging grid that consists of N image pixels. Each pixel from the imaging grid is located at coordinate The imaging grid is usually defined as a 2-D rectangular shape. In general, however, the image grid could be arbitrary. For example, a 3-D imaging grid would be formed for ground penetration radar to detect targets and structures buried underground. Another example is 3-D image of inside human body.

After the data points are established in an aperture (or array), as, for example, diagrammatically shown in FIGS. 2 and 3, a substantial portion of data points are removed from the original aperture (array of data points) to form a "subarray." Conversely, the "subarray" may be formed by the selection of data points within the original aperture.

As used herein, the terminology "subject" or "object" or "target" may include a thing, a person, animate or inanimate subject, a plurality of objects, the ground, ground covering (e.g., grass), a localized piece or pieces of the environment, surface, physical entity (or entities) or anything that can be observed.

Embodiments of the present invention are described herein are schematic illustrations of idealized embodiments of the present invention. The embodiments of the present invention should not be construed as limited to a particular design or program language and are not intended to limit the scope of the present invention.

Although a few exemplary embodiments of the present invention have been shown and described, it would be appreciated by those skilled in the art that changes may be made in these embodiments, without departing from the principles and spirit of the invention, the scope of which is defined in the claims and their equivalents.

The invention claimed is:

1. A method for generating images comprising:
   receiving, via a radar, radar return signals from an area of interest at a number of radar positions; acquiring radar return data and positional data from the radar; each of the positional data forming a positional record in an array of positional records; each of the radar data comprising a first number of radar data points in the frequency domain;
   forming an image comprising an array of pixel values comprising:
   a) randomly setting a percentage of the first number of radar data points to zero; thereby selecting subsets of receive channels for removal from the complete first number of radar data points;
   b) transforming the first number of radar data points into time domain signature data;
   c) differentiating the signature data in the time domain to create a new set of signature data indicating the location of moving targets;
   d) forming an image by processing the signature data utilizing an imaging subsystem that combines the positional and signature data to form the moving target indication image utilizing one of a back-projection algorithm or range migration algorithm;
   e) saving the pixel values for each of the image pixels into a composite image;
   f) repeating the step of randomly setting a percentage of the radar data points to zero;
   g) transforming the first number of radar data points into time domain signature data;
   h) differentiating the signature data in the time domain to create a new set of signature data indicating the location of moving targets;
   i) forming a second image by processing the signature data utilizing an imaging subsystem that combines the positional and signature data to form SAR imagery utilizing one of a back-projection algorithm or range migration algorithm;
   j) comparing the pixel values at each of the pixel locations in the second image to the corresponding pixel values of the composite image;
   k) replacing the pixel values in the composite image if the pixel value is less in the second image than it is in the composite image;
   l) repeating steps i) through k) for a pre-determined number of iterations;
   whereby the composite image is outputted with reduced sidelobes and noise.

2. The method of claim 1 wherein the percentage of the first number of radar data points set to zero is in the range of approximately twenty to fifty percent.

3. The method of claim 1, further comprising the step of processing return radar signals using a signal processing subsystem, the signal processing subsystem comprising at least one signal processing algorithm performed to suppress unwanted noise from the returned radar data.

4. The method of claim 1 wherein data is collected at later points in time so that the target may be observed in different locations.

5. The method of claim 1 wherein the number of iterations is within the range of 10 to 1000 and preferably within the range of 20 to 150.

6. The method of claim 1 wherein the radar signature data comprises synchronous impulse reconstruction radar data.

7. The method of claim 1 wherein prior to inputting from at least one receive channel data collected at first and second predetermined times, the pixel locations in the array are initialized by setting all values to a number in the range of approximately $10^{10}$ to $10^{31}$, and wherein the image is formed using one of time-differencing or Doppler processing.

8. A method for generating images comprising:
   receiving, via a radar, radar return signals from an area of interest at a number of radar positions; acquiring radar return data and positional data from the radar; each of the positional data forming a positional record in an array of positional records; each of the radar data comprising a first number of radar data points in the frequency domain,
   forming an image comprising an array of pixel values comprising:
   a) randomly setting a percentage of the first number of radar data points to zero;
   b) transforming the first number of radar data points into time domain projection data;
   c) differentiating the projection data in the time domain to create a new set of projection data indicating the location of moving targets;
   d) forming an image by processing the projection data utilizing an imaging subsystem that combines the positional and projection data to form the moving target indication (MTI) imagery utilizing one of a back-projection algorithm or range migration algorithm;
   e) forming the complete aperture $A_0$ for MTI image formation comprising combining the projection data, the coordinates of the receiver, and the coordinates of the transmitter for each positional record;

f) forming an imaging grid comprising M image pixels wherein each pixel in the imaging grid is located at coordinate $(x_P(i), y_P(i), z_P(i))$;
g) saving the pixel values for each of the M image pixels into a composite image grid;
h) randomly setting a percentage of the first number of radar data points to zero;
i) transforming the first number of radar data points into time domain projection data;
j) differentiating the projection data in the time domain to create a new set of projection data indicating the location of moving targets;
k) forming an image by processing the projection data utilizing an imaging subsystem that combines the positional and projection data to form the SAR imagery utilizing one of a back-projection algorithm or range migration algorithm;
l) forming the complete aperture $A_0$ for MTI image formation comprising combining the projection data, the coordinates of the receiver, and the coordinates of the transmitter for each positional record;
m) forming an imaging grid comprising M image pixels wherein each pixel in the imaging grid is located at coordinate $(x_P(i), y_P(i), z_P(i))$;
n) comparing the pixel values of the imaging grid to the corresponding pixel values of the composite image;
o) replacing the pixel values in the composite image grid if the pixel value is less in the imaging grid than the corresponding pixel value of the composite image grid to form a new composite image grid;
p) repeating the steps h) through o) for a predetermined number of iterations;
whereby the composite image grid is outputted with reduced sidelobes and noise.

9. The method of claim 8 wherein the percentage of the first number of radar data points set to zero is in the range of approximately twenty to fifty percent.

10. The method of claim 8 wherein the radar projection data comprises synchronous impulse reconstruction radar data.

11. A method for generating images comprising:
receiving, via a radar, radar return signals from an area of interest at a number of radar positions; acquiring positional data and radar return data at different frequencies from the radar; each of the positional data forming a positional record in an array of positional records; each of the radar data comprising a first number of radar data points in the frequency domain;
forming an image comprising an array of pixel values comprising the steps of:
a) randomly setting a percentage of the first number of radar data points to zero; thereby selecting subsets of receive channels for removal from the complete first number of radar data points;
b) transforming the first number of radar data points into time domain signature data;
c) differentiating the signature data in the time domain to create a new set of signature data indicating the location of moving targets;
d) forming an image by processing the signature data utilizing an imaging subsystem that combines the positional and signature data to form the moving target indication image utilizing one of a back-projection algorithm or range migration algorithm;
e) saving the pixel values for each of the image pixels into a composite image;
f) repeating the step of randomly setting a percentage of the radar data points to zero;
g) transforming the first number of radar data into time domain signature data;
h) differentiating the signature data in the time to create a new set of signature data indicating the location of moving targets;
i) forming a second moving target indication image by processing signature data utilizing an imaging subsystem that combines the positional and signature data to form SAR imagery utilizing one of a back-projection algorithm or range migration algorithm;
j) comparing the pixel values at each of the pixel locations in the second image to the corresponding pixel values at each of the pixel locations in the composite image;
k) replacing the pixel values in the composite image if the pixel value in the second moving target indication image is less than the corresponding pixel value of the composite image; and
l) repeating steps f) through k) for a pre-determined number of iterations;
whereby the composite image is outputted with reduced sidelobes and noise.

* * * * *